(12) United States Patent
Nishitani et al.

(10) Patent No.: US 6,897,860 B2
(45) Date of Patent: May 24, 2005

(54) GRAPHICS PROCESSING APPARATUS AND METHOD FOR COMPUTING THE DISTANCE BETWEEN THREE-DIMENSIONAL GRAPHIC ELEMENTS

(75) Inventors: Hitoshi Nishitani, Ibaraki (JP); Naoki Nakanishi, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 239 days.

(21) Appl. No.: 10/147,866

(22) Filed: May 20, 2002

(65) Prior Publication Data

US 2002/0175912 A1 Nov. 28, 2002

(30) Foreign Application Priority Data

May 28, 2001 (JP) ........................... 2001-158529
May 28, 2001 (JP) ........................... 2001-158531
Mar. 19, 2002 (JP) ........................... 2002-075982

(51) Int. Cl.$^7$ ........................................... G06T 15/00
(52) U.S. Cl. ................................................... 345/419
(58) Field of Search .............................. 345/418, 419, 345/421, 427, 643, 660, 619

(56) References Cited

U.S. PATENT DOCUMENTS 5,787,889 A * 8/1998 Edwards et al. ............ 600/443
5,963,211 A * 10/1999 Oikawa et al. ............. 345/424
6,222,551 B1 * 4/2001 Schneider et al. .......... 345/419
6,526,166 B1 * 2/2003 Gorman ..................... 382/154
6,654,014 B2 * 11/2003 Endo et al. ................. 345/427

FOREIGN PATENT DOCUMENTS

JP          10-31757 A          3/1998

* cited by examiner

Primary Examiner—Phu K. Nguyen
(74) Attorney, Agent, or Firm—Fitzpatrick, Cella, Harper & Scinto

(57) ABSTRACT

A graphics processing apparatus for computing the distance between two three-dimensional graphic elements without reducing the user's operating efficiency is provided. The graphics processing apparatus selects, from among three-dimensional objects displayed on a display, graphic elements between which the distance is to be computed, determines a projection reference in accordance with a viewing direction and geometric information on the graphic elements, and determines a projection plane in accordance with the projection reference. The graphic elements are projected onto the determined projection plane, and the minimum distance between the selected graphic elements is computed from the projected graphic elements.

17 Claims, 33 Drawing Sheets

FIG. 14A

| ELEMENT | | | SPHERE 2 | PLANE 2 | BODY OF REVOLUTION 2 |
|---|---|---|---|---|---|
| | | | CENTRAL POINT 2 | ALL NORMAL LINES 2 | CENTRAL LINE 2 |
| SPHERE 1 | CENTRAL POINT 1 | COMBINATION<br>1) POSITIONAL RELATIONSHIP<br>2) ALL PLANES N INCLUDING PROJECTION REFERENCES 1 AND 2<br>3) NORMAL LINES OF PLANES N<br>4) PROJECTING DIRECTION 2 | Combination 1-1-1<br>Central points 1 and 2 coincide with each other<br>All planes including central points 1 and 2<br>All directions<br>Viewing direction | Combination 1-1-2<br>All cases<br>All planes which pass through central point 1 and which are perpendicular to plane 1<br>All directions parallel to plane 2<br>Of directions parallel to plane 2, direction closest to viewing direction | Combination 1-1-3<br>Central point 1 is on central line 2<br>All planes including central line 2<br>All directions perpendicular to central line 2<br>Of all directions perpendicular to central line 2, direction closest to viewing direction |
| PLANE 1 | ALL NORMAL LINES 1 | COMBINATION<br>1) POSITIONAL RELATIONSHIP<br>2) ALL PLANES N INCLUDING PROJECTION REFERENCES 1 AND 2<br>3) NORMAL LINES OF PLANES N<br>4) PROJECTING DIRECTION 2 | Combination 1-2-1<br>All cases<br>All planes which include central point 2 and which are perpendicular to plane 1<br>All directions parallel to plane 1<br>Of directions parallel to plane 1, direction closest to viewing direction | Combination 1-2-2<br>All cases<br>All planes perpendicular to both planes 1 and 2<br>All directions parallel to both planes 1 and 2<br>Of all directions parallel to both planes 1 and 2, direction closest to viewing direction | Combination 1-2-3<br>All cases<br>Planes which are perpendicular to plane 1 and which include central line 2<br>All directions which are parallel to plane 1 and which are perpendicular to central line 2<br>Of all directions which are parallel to plane 1 and which are perpendicular to central line 2, direction closest to viewing direction |
| BODY OF REVOLUTION 1 | CENTRAL LINE 1 | COMBINATION<br>1) POSITIONAL RELATIONSHIP<br>2) ALL PLANES N INCLUDING PROJECTION REFERENCES 1 AND 2<br>3) NORMAL LINES OF PLANES N<br>4) PROJECTING DIRECTION 2 | Combination 1-3-1<br>Central point 2 is on central line 1<br>All planes including central line 1<br>All directions perpendicular to central line 1<br>Of all directions perpendicular to central line 1, direction closest to viewing direction | Combination 1-3-2<br>All cases<br>All planes which include central line 1 and which are perpendicular to plane 2<br>All directions which are perpendicular to central line 1 and which are parallel to plane 2<br>Of all directions which are perpendicular to central line 1 and which are parallel to plane 2, direction closest to viewing direction | Combination 1-3-3<br>Central lines 1 and 2 intersect with each other or coincide with each other<br>Planes which include central lines 1 and 2<br>All directions perpendicular to both central lines 1 and 2<br>Of all directions perpendicular to both central lines 1 and 2, direction closest to viewing direction |

FIG. 14B

| ELEMENT | | | SPHERE 2 | PLANE 2 | BODY OF REVOLUTION 2 |
|---|---|---|---|---|---|
| | | | CENTRAL POINT 2 | ALL NORMAL LINES 2 | CENTRAL LINE 2 |
| SPHERE 1 | CENTRAL POINT 1 | COMBINATION<br>1) POSITIONAL RELATIONSHIP<br>2) LINE SEGMENT L CONNECTING PROJECTION REFERENCES 1 AND 2 OVER MINIMUM DISTANCE<br>3) ALL PLANES M INCLUDING PROJECTION REFERENCE 1 AND LINE SEGMENT L<br>4) NORMAL LINES OF PLANES M<br>5) PROJECTING DIRECTION 2 | Combination 2-1-1<br>Central points 1 and 2 do not coincide with each other<br>Line segment connecting central points 1 and 2<br>All planes including line segment L<br>All directions perpendicular to line segment L<br>Of all directions perpendicular to line segment L, direction closest to viewing direction | Combination 2-1-2 | Combination 2-1-3<br>Central point 1 is not on central line 2<br>Perpendicular line drawn from central point 1 to central line 2<br>All planes including perpendicular line L<br>All directions perpendicular to perpendicular line L<br>Of all directions perpendicular to perpendicular line L, direction closest to viewing direction |
| PLANE 1 | ALL NORMAL LINES 1 | COMBINATION<br>1) POSITIONAL RELATIONSHIP<br>2) LINE SEGMENT L CONNECTING PROJECTION REFERENCES 1 AND 2 OVER MINIMUM DISTANCE<br>3) ALL PLANES M INCLUDING PROJECTION REFERENCE 1 AND LINE SEGMENT L<br>4) NORMAL LINES OF PLANES M<br>5) PROJECTING DIRECTION 2 | Combination 2-2-1 | Combination 2-2-2 | Combination 2-2-3 |
| BODY OF REVOLUTION 1 | CENTRAL LINE 1 | COMBINATION<br>1) POSITIONAL RELATIONSHIP<br>2) LINE SEGMENT L CONNECTING PROJECTION REFERENCES 1 AND 2 OVER MINIMUM DISTANCE<br>3) ALL PLANES M INCLUDING PROJECTION REFERENCE 1 AND LINE SEGMENT L<br>4) NORMAL LINES OF PLANES M<br>5) PROJECTING DIRECTION 2 | Combination 2-3-1<br>Central point 2 is not on central line 1<br>Perpendicular line drawn from central point 2 to central line 1<br>Planes including perpendicular line L and central line 1<br>Direction perpendicular to perpendicular line L and central line 1<br>Of directions perpendicular to perpendicular line L and central line 1, direction closest to viewing direction | Combination 2-3-2 | Combination 2-3-3<br>Central lines 1 and 2 are parallel to each other or skewed<br>Perpendicular line drawn from central line 1 to central line 2<br>Planes including perpendicular line L and central line 1<br>Directions perpendicular to perpendicular line L and central line 1<br>Of directions perpendicular to perpendicular line L and central line 1, direction closest to viewing direction |

FIG. 15A
FIG. 15B
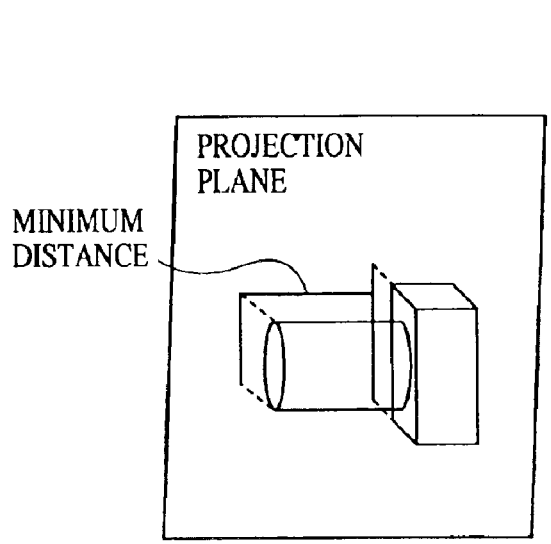
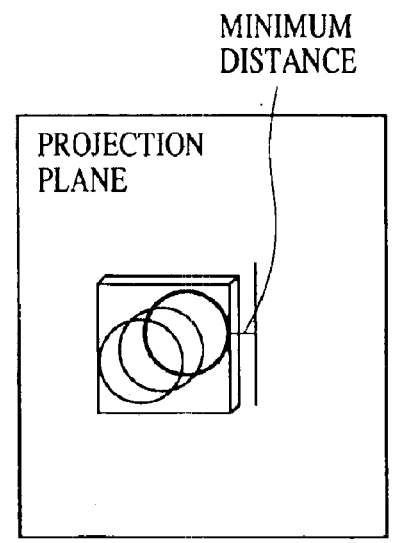
FIG. 16
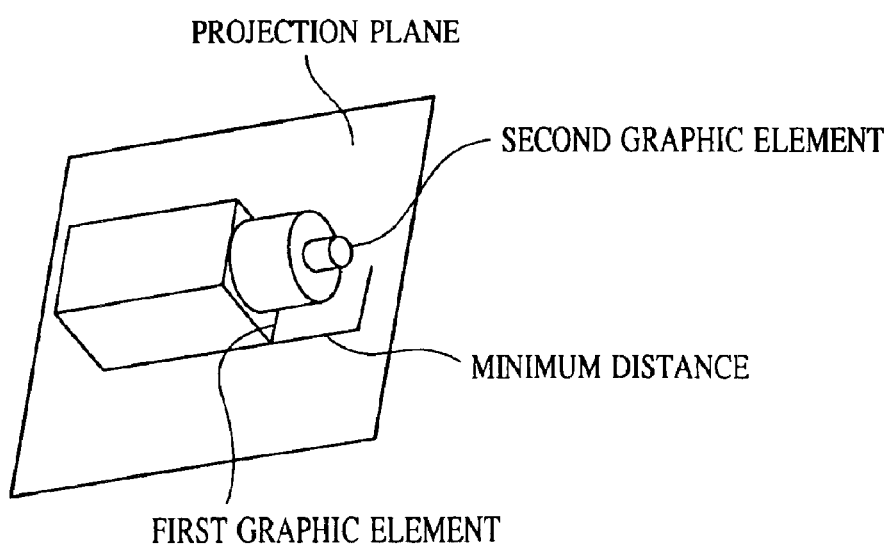

PROJECTION PLANE

MINIMUM DISTANCE

PROJECTION PLANE

MINIMUM DISTANCE

PROJECTION PLANE

MINIMUM DISTANCE

PROJECTION PLANE

MINIMUM DISTANCE

FIG. 27A
FIG. 27B
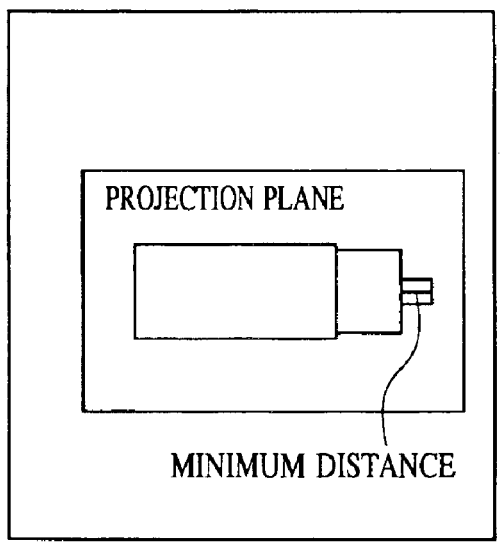
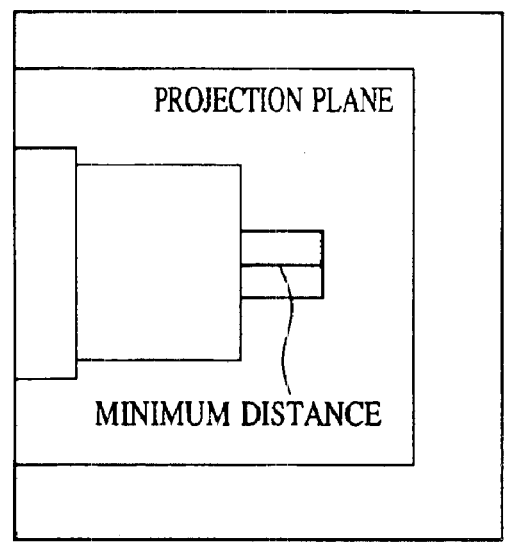

GRAPHICS PROCESSING APPARATUS AND METHOD FOR COMPUTING THE DISTANCE BETWEEN THREE-DIMENSIONAL GRAPHIC ELEMENTS

BACKGROUND OF THE INVENTION

1. Field of the Invention

The present invention relates to graphics processing apparatuses and methods, and more particularly, it relates to a graphics processing apparatus and method for projecting graphic elements required by a user onto a projection plane in a CAD (computer-aided design) system and for computing the distance between the graphic elements.

2. Description of the Related Art

Recently, the performance of computers has improved dramatically, and hence, various processes can be performed using computers. For example, CAD systems simulate designs, which can be viewed from various planes, on a computer. Although CAD systems used to require relatively expensive computers, many CAD systems now can be implemented on personal computers.

A combination of graphic elements, such as points, edge lines, planes, etc. are used for design in CAD systems, and it is necessary to compute the distance between these graphic elements.

The following methods for computing the distance between graphic elements are known:

(1) A method for computing the minimum distance between two elements, such as a point, an edge line, a plane, etc., which are a user's desired measurement objects designated in sequence by a user using an input device, such as a mouse, while displaying three-dimensional models to be measured on a computer display, and for displaying the resulting computed minimum distance using an additional display/output device.

(2) A method for computing the minimum distance between two elements, such as a point, an edge line, a plane, etc., which are a user's desired measurement objects, while displaying three-dimensional models to be measured on a computer display. In this method, the user uses an input device, such as a mouse, to move a position indicator, such as a pointer, toward two elements to be measured. When the distance between the graphic element displayed on the display and the pointer is within a predetermined distance, the color of the graphic element displayed on the display changes. The user confirms the elements to be measured, and the minimum distance in the three-dimensional space is computed. The resulting computed minimum distance is displayed using an additional display/output device.

(3) A method for computing the minimum distance between two elements, such as a point, an edge line, a plane, etc., which are a user's desired measurement objects, while displaying three-dimensional models to be measured on a computer display, and for displaying the resulting computed minimum distance using an additional display/output device. The user uses an input device, such as a mouse, to move a position indicator, such as a pointer, toward two elements to be measured. Of clipped graphic elements which are within a predetermined distance from a position determined by the user, an element which is closest to a view point in the three-dimensional space, that is, an element displayed in the foreground of the display, is regarded as an object to be measured. The minimum distance in the three-dimensional space is computed, and the resulting computed distance is displayed on the additional display/output device.

(4) A method according to the method described in (1), wherein an orthogonal projection of a line segment, which indicates the minimum distance, onto the user's desired projection plane is computed. Accordingly, the projected minimum distance between the elements in the three-dimensional space is computed.

(5) A method according to the method described in (2), wherein an orthogonal projection of a line segment, which indicates the minimum distance, onto the user's desired projection plane is computed. Accordingly, the projected minimum distance between elements is computed.

(6) A method according to the method described in (3), wherein an orthogonal projection of a line segment, which indicates the minimum distance, onto the user's desired projection plane is computed. Accordingly, the projected minimum distance between elements is computed.

(7) A method for computing the minimum distance between elements, as in Japanese Patent Laid-Open No. 10-31757 describing a graphics processing apparatus and a method for computing the minimum distance between elements, wherein the direction from which a user views a display displaying the three-dimensional space is taken into consideration.

FIGS. 30A and 30B show measurement results computed by the foregoing methods for computing the minimum distance between elements. Referring to FIG. 30A, a line 301 and an arc 302 are elements to be measured. A projection plane 303 is a plane onto which the elements are projected. A line segment 304 indicates the computed minimum distance, which is the measurement result.

Referring to FIG. 30B, an arc 301 and an arc 302 are elements to be measured. A projection plane 303 is a plane onto which the elements are projected. A line segment 304 indicates the computed minimum distance, which is the measurement result.

In the foregoing known methods for computing the minimum distance between elements, a few methods are employed to specify the plane onto which the elements are projected.

(A) In accordance with several projection planes, corresponding commands for computing the minimum distance between elements are prepared in advance. The user selects the command corresponding to a desired projection plane, and measurement is performed. FIG. 31 is a schematic illustration of this method. In accordance with three projection planes, namely, the xy plane, the yz plane, and the xz plane, corresponding commands for computing the minimum distance between elements are prepared in advance. For example, when the user wants to measure the distance between elements projected onto the yz plane, the user selects in advance the command for the yz plane projection, and measurement is performed.

(B) In a command for computing the distance between elements, a plurality of projection planes is set in advance. After the user has selected elements to be measured, the distances between the elements, which are projected onto all the prepared projection planes, are displayed at the same time or one after another. Of these measurement results, the user can selectively read the measurement result which is projected onto a desired projection plane. Accordingly, measurement is performed. FIG. 32 is a schematic illustration of this method. Three projection planes, namely, the xy plane, the yz plane, and the xz plane, are set in advance. All the measurement results, which are computed by projecting the elements onto these projection planes, are displayed. In this case, when all the measurement results are displayed at the same time, visibility for the user is obstructed. In actual use, the measurement results are generally displayed one at a time by operating an input device, such as a keyboard or a mouse.

(C) In a command for computing the minimum distance between elements, no projection plane is set. Similar to a case in which the user selects components to be measured, the user selects a projection plane. Accordingly, the minimum distance between elements projected onto the user's desired projection plane is computed. FIG. 33 is a schematic illustration of this method. The user selects graphic elements 331 and 332, which are elements to be measured, and a plane 333, which is the user's desired projection plane. As a result, the minimum distance projected onto the plane 333 is displayed. Generally, the projection plane can be selected by selecting a plane parallel to the user's desired projection plane, by selecting a line perpendicular to the user's desired projection plane and the position of the projection plane, or by freely switching a projection plane by the user.

(D) A method combining the foregoing methods described in (B) and (C). Specifically, a plurality of planes, which are candidates for a projection plane, is prepared in each command for computing the minimum distance between elements. These planes are preferentially displayed. When these planes do not include the result of projecting the elements which are projected onto the user's desired plane, the user can select the projection plane by a method similar to that described in (C).

In the methods described in (A) and (B), the user is not required to select the projection plane. However, measurement is performed using only the projection planes prepared in advance. Thus, these methods are not practical.

In the methods described in (C) and (D), the user can reliably select the user's desired projection plane. Thus, these methods are practical. However, the user is required to perform an operation to select the projection plane. This reduces the operating efficiency. When no plane parallel to the user's desired projection plane nor line perpendicular to the user's desired projection plane is displayed on the display screen, it is necessary to create and display a plane or a line, which is required for selecting the projection plane, on the display screen before implementing the command for computing the minimum distance between elements. Thus, the operating efficiency is further reduced.

In the above examples, when the number of components displayed on the display increases, the displayed components obstruct the user's view. It becomes difficult for the user to see the measurement result and to confirm whether or not the user's desired portions have been measured.

In order to confirm the measurement result, the user is forced to perform operations to change the viewing direction (the direction of the sight line) after the measurement result is displayed or to hide the components obstructing the user's sight line. These operations for changing the sight line or hiding the components reduce the user's operating efficiency. In addition, in order that the user who has confirmed the measurement result can return to the operation immediately before the minimum-distance measurement, the user is required to perform additional operations to again display the components and to return the viewing direction to its former state. As a result, the user's operating efficiency is further reduced. These operations cause serious problems with the usability of an apparatus for computing the minimum distance between elements.

SUMMARY OF THE INVENTION

In order to solve the foregoing problems, it is an object of the present invention to provide a graphics processing apparatus and method having a function for specifying a projecting direction and a projection plane which coincide with those desired by a user with a high probability, so that the user is not required to select the projection plane, and so that the operating efficiency and the usability are greatly improved.

It is another object of the present invention to provide a graphics processing apparatus and method having a function for computing the minimum distance between graphic elements and enabling a user to easily confirm the measurement result without reducing the user's operating efficiency.

In order to achieve the foregoing objects, a graphics processing apparatus according to an aspect of the present invention includes a display unit for displaying a stereographic image of three dimensional graphic elements; an input unit for inputting an operation regarding the stereographic image displayed on the display unit; a geometric information storage unit for storing, when a first graphic element and a second graphic element are selected by the input unit, geometric information on the selected first and second graphic elements; a first reference determination unit for determining a projection reference for the first graphic element in accordance with the first-graphic-element geometric information; a second reference determination unit for determining a projection reference for the second graphic element in accordance with the second-graphic-element geometric information; a viewing-direction storage unit for storing a viewing direction from which the image displayed on the display unit is viewed; a projection-plane determination unit for determining a projection plane onto which the graphic elements are projected in accordance with the viewing direction, the first-graphic-element projection reference, and the second-graphic-element projection reference; a projection unit for projecting the first graphic element and the second graphic element onto the projection plane; and an arithmetic computing unit for computing the distance between the first graphic element and the second graphic element in accordance with the graphic elements projected onto the projection plane.

According to another aspect of the present invention, a graphics processing apparatus includes a display unit for displaying a stereographic image of three dimensional graphic elements; an input unit for inputting an operation regarding the stereographic image displayed on the display unit; a geometric information storage unit for storing, when a first graphic element and a second graphic element are selected by the input unit, geometric information on the selected first and second graphic elements; a setting unit for setting a projection plane onto which the first graphic element and the second graphic element are projected; a projection unit for projecting the first graphic element and the second graphic element onto the projection plane; a computation unit for computing a direction perpendicular to the projection plane; and a display control unit for displaying the projection plane on the display unit in accordance with the computed direction.

According to a further aspect of the present invention, a graphics processing method for a graphics processing apparatus including a display unit for displaying a stereographic image of three dimensional graphic elements and an input unit for inputting an operation regarding the stereographic image displayed on the display unit is provided. The graphics processing method includes a geometric information storing step of storing, when a first graphic element and a second graphic element are selected by the input unit, geometric information on the selected first and second graphic elements; a first reference determination step of determining a projection reference for the first graphic element in accordance with the first-graphic-element geometric information; a second reference determination step of determining a projection reference for the second graphic element in accordance with the second-graphic-element geometric information; a viewing-direction storing step of storing a viewing direction from which the image displayed on the display unit is viewed; a projection-plane determination step of determining a projection plane onto which the graphic elements are projected in accordance with the viewing direction, the first-graphic-element projection reference, and the second-graphic-element projection reference; a projection step of projecting the first graphic element and the second graphic element onto the projection plane; and an arithmetic computing step of computing the distance between the first graphic element and the second graphic element in accordance with the graphic elements projected onto the projection plane.

In accordance with yet another aspect of the present invention, a graphics processing method for a graphics processing apparatus including a display unit for displaying a stereographic image of three dimensional graphic elements and an input unit for inputting an operation regarding the stereographic image displayed on the display unit is provided. The graphics processing method includes a geometric-information storing step of storing, when a first graphic element and a second graphic element are selected by the input unit, geometric information on the selected first and second graphic elements; a setting step of setting a projection plane onto which the first graphic element and the second graphic element are projected; a projection step of projecting the first graphic element and the second graphic element onto the projection plane; a computation step of computing a direction perpendicular to the projection plane; and a display control step of displaying the projection plane on the display unit in accordance with the computed direction.

Further objects, features, and advantages of the present invention will become apparent from the following description of the preferred embodiments with reference to the attached drawings.

BRIEF DESCRIPTION OF THE DRAWINGS

FIGS. 14A and 14B are tables showing the relationships of the specific combinations of the first and second graphic elements with processing.

FIGS. 15A and 15B illustrate examples of the measurement results displayed on the display shown in FIG. 1.

FIG. 16 illustrates an example of the measurement result displayed on the display shown in FIG. 1.

FIGS. 27A and 27B illustrate examples of images displayed on the display shown in FIG. 20.

DESCRIPTION OF THE PREFERRED EMBODIMENTS

Embodiments according to a graphics processing apparatus of the present invention will be described with reference to the drawings.

First Embodiment

Figure 1:
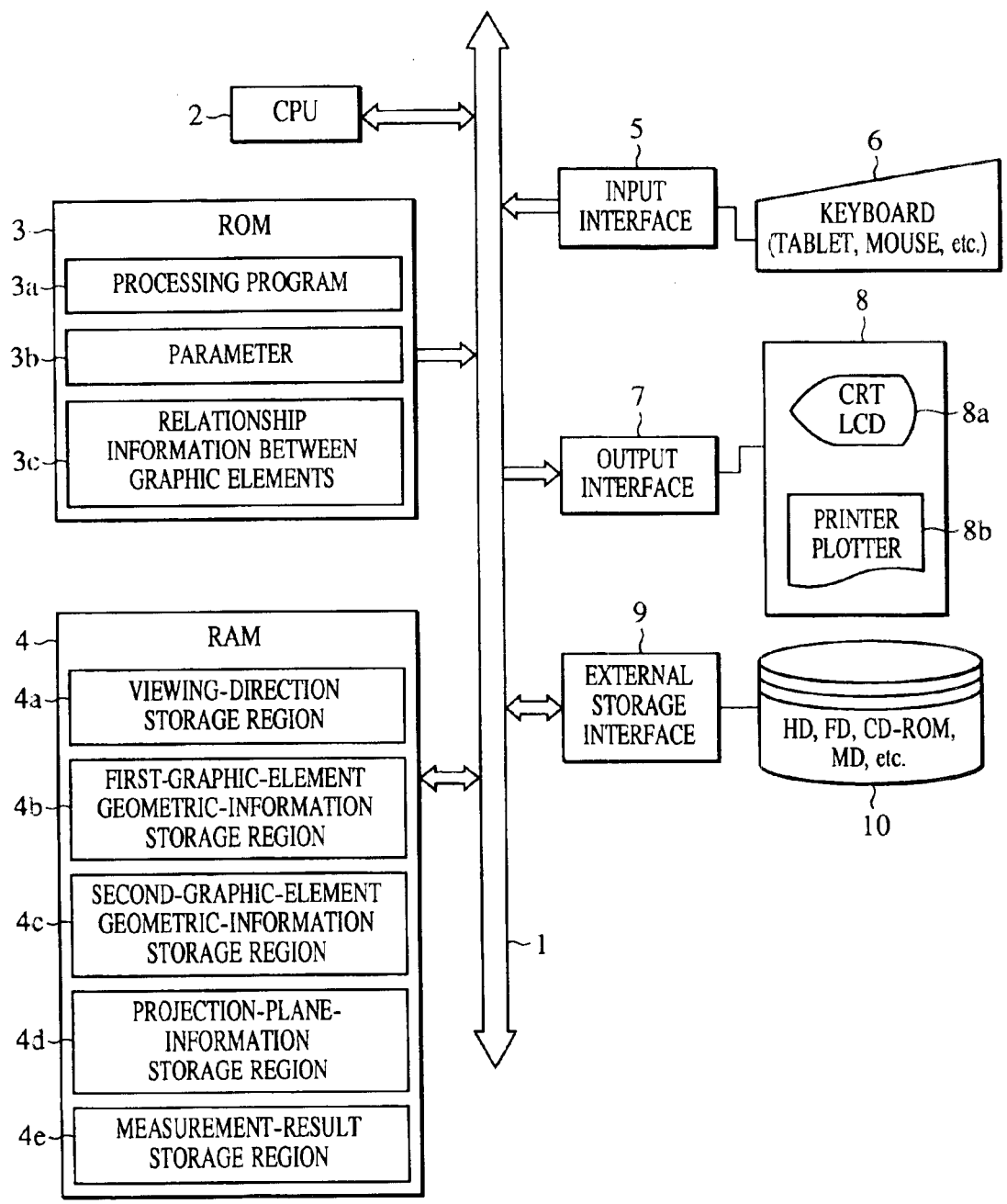
FIG. 1 is a block diagram of a graphics processing apparatus according to a first embodiment of the present invention.

FIG. 1 shows the configuration of a graphics processing apparatus according to a first embodiment of the present invention. The graphics processing apparatus contains a bus 1, which includes a control line, a data line, and an address line. A central processing unit (CPU) 2, a read only memory (ROM) 3, and a random access memory (RAM) 4 are connected to the bus 1. An input device 6, such as a keyboard, a tablet, a mouse, etc., is connected through an input interface 5 to the bus 1. An output device 8 is connected through an output interface 7 to the bus 1. An external storage device 10 is connected through an external storage interface 9 to the bus 1. The output device 8 is formed by a display output device 8a, such as a cathode ray tube (CRT) or a liquid crystal display (LCD), and a print output device 8b, such as a printer or a plotter. The external storage device 10 is formed by magnetic disks, such as a hard disk (HD), a floppy disk (FD), a CD-ROM, a mini disk (MD), etc., and a magnetic tape.

The CPU 2 controls the overall apparatus. The ROM 3 stores a processing program 3a, a parameter 3b, and relationship information between graphic elements 3c. The RAM 4 includes a viewing-direction storage region 4a, a first-graphic-element geometric-information storage region 4b, a second-graphic-element geometric-information storage region 4c, a projection-plane-information storage region 4d, a measurement-result storage region 4e, and a graphic-element storage region (not shown). In accordance with the processing program 3a stored in the ROM 3, the CPU 2 uses the RAM 4 as a temporary storage device and performs various control processes, such as graphic input control, graphic display control, picking processing, and computation of the distance. The display 8a includes a plurality of bit map planes according to need and displays a graphic image.

Figure 2:
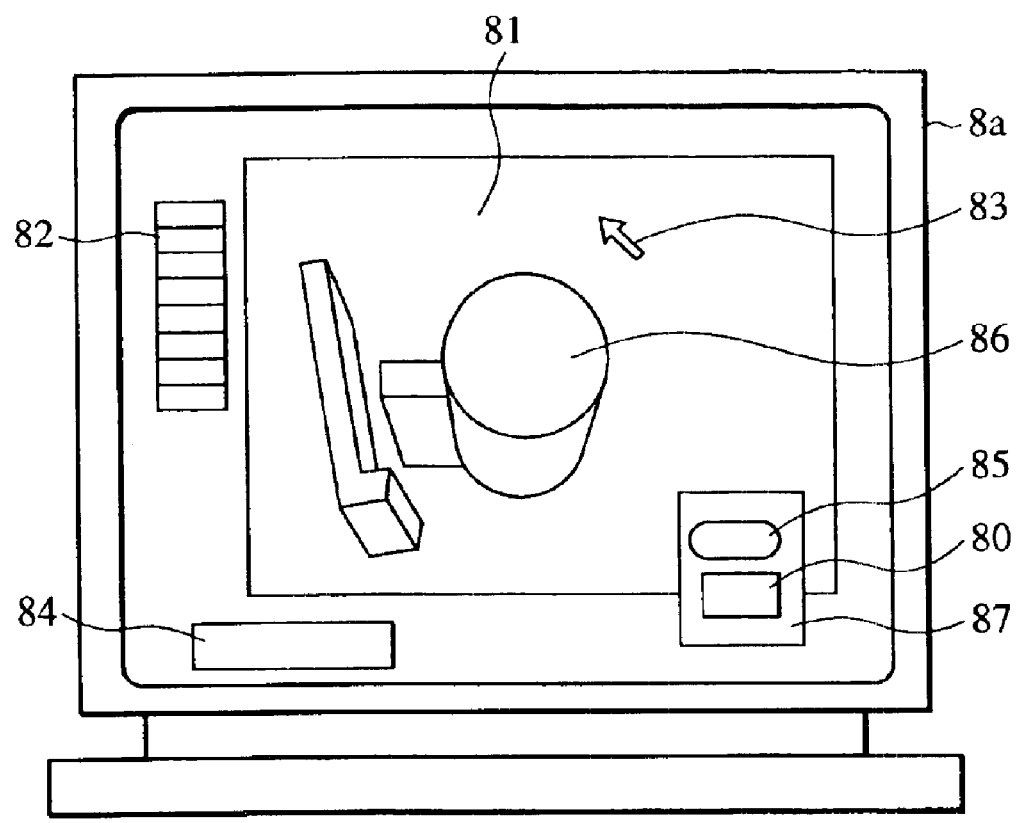
FIG. 2 illustrates an example of a window displayed on a display shown in FIG. 1.

FIG. 2 illustrates an example of an image displayed on the display 8a. The display 8a includes a graphic display area 81, first buttons 82, a mouse pointer 83, a first information output area 84, a panel 87, a second button 85 on the panel 87, a second information output area 80 on the panel 87, and three-dimensional graphic elements 86. All of these buttons are soft keys. In the graphic display area 81, the three-dimensional graphic elements 86 are displayed in accordance with graphic elements stored in the graphic-element storage region (not shown) of the RAM 4.

On the display 8a, the minimum distance between the displayed three-dimensional graphic elements 86 is interactively computed by operating the input device 6 including the keyboard, the mouse, etc. Using the mouse pointer 83 and the input device 6, an appropriate position on the first buttons 82 is selected. Thus, the graphics processing apparatus enters a mode in which the minimum distance between elements is computed.

Figure 3:
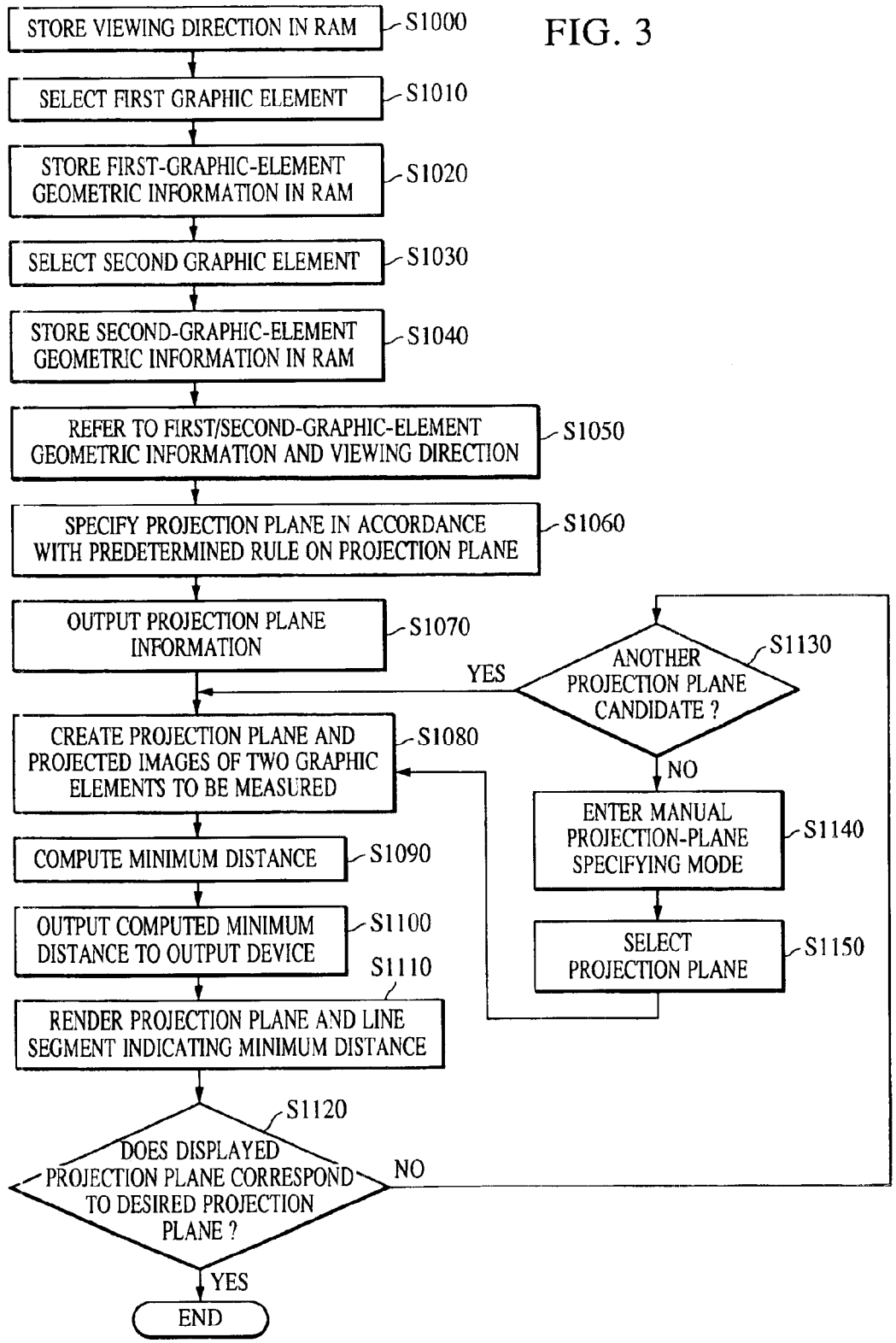
FIG. 3 is a flowchart showing a process of computing the distance between graphic elements in the graphics processing apparatus shown in FIG. 1.

In accordance with a flowchart shown in FIG. 3, a process of computing the minimum distance between graphic elements in the first embodiment will now be described.

In response to an input from the keyboard or by moving the mouse pointer 83 using the mouse, the mode in which the minimum distance between graphic elements is computed is designated from among the first buttons 82.

In step S1000, the process stores a viewing direction at the time the graphics processing apparatus has entered the minimum-distance computation mode in the viewing-direction storage region 4a of the RAM 4.

In step S1010, a first graphic element (point, line, plane, arc, etc.), which is a measurement object desired by the user, is selected by operating the input device 6 including the mouse and the keyboard. In order to prevent an erroneous selection and to improve the operating efficiency, a filtering function for making the user designate beforehand attributes (types including point, line, plane, arc, etc.) of graphic elements the user wants to select can be provided so that only graphic elements having the corresponding attributes are selectable, or a filtering function for making the user designate beforehand a component containing graphic elements the user wants to select is provided so that only graphic elements included in the corresponding component are selectable.

When graphic elements to be selected are disposed at positions at which the graphic elements are hard to see, an interruption function may be provided. Specifically, the user can interrupt the process and insert an operation to freely change the position of a view point or the viewing direction using the input device 6 including the mouse. Also, an imaginary element selecting function may be provided. Specifically, in order that the user can select an imaginary point, such as the center of an arc or the midpoint of a line segment, or an imaginary line, such as the center of a circular cylindrical plane, the selection of an arc causes the apparatus to perform processing as if the central point of the arc is selected; the selection of a line segment causes the apparatus to perform processing as if the midpoint of the line segment is selected; or the selection of a circular cylindrical plane causes the apparatus to perform processing as if the central axis of the circular cylindrical plane is selected. In the following description, as in general geometry, a line with finite ends is referred to as a "line segment", and an infinitely long line is referred to as a "line".

In step S1020, geometric information on the selected first graphic element is stored in the first-graphic-element geometric-information storage region 4b of the RAM 4. The geometric information includes parameters required for uniquely determining a space figure, that is, coordinates of an end point, a vertex, and a central point in accordance with a graphic figure, such as a point, a line, an arc, a plane, a circular cylindrical plane, etc., and the radius of a circle.

In step S1030, a second graphic object, which is a measurement object desired by the user, is selected by operating the input device 6 including the mouse and the keyboard. In this case, as in step S1010, the foregoing filtering functions, the interruption function, and the imaginary element selecting function may be provided.

In step S1040, geometric information on the selected second graphic element is stored in the second-graphic-element geometric-information storage region 4c of the RAM 4.

In step S1050, in order to specify a projection plane, the process refers to the geometric information on the first and second graphic elements, which are stored in the corresponding storage regions 4b and 4c of the RAM 4, and to the viewing direction, which is stored in the storage region 4a.

In step S1060, the process specifies a candidate for a plane onto which the graphic elements are to be projected in accordance with the predetermined relationship between the graphic elements, which is stored in the region 3c of the ROM 3. In step S1070, the process stores the specified projection plane information in the projection-plane-information storage region 4d of the RAM 4. The projection plane information includes a parameter for uniquely determining the projection plane, such as a normal vector and a point at which a plane passes through. If there is a plurality of candidates, the candidates are prioritized. The relationship between the graphic elements, which is used to specify the projection plane, is described hereinafter.

In step S1080, the projection plane specified in step S1070 is created, and projected images of the two graphic elements, which are the selected measurement objects, are created on the created projection plane.

In step S1090, the minimum distance between the two projected images, which are created in step S1080, is computed.

In step S1100, the minimum distance, which is computed in step S1090, is output to the first information output area 84 of the display 8a.

In step S1110, a projection plane and a line segment indicating the minimum distance are rendered in accordance with information on the projection plane, which is specified in step S1070, and the minimum distance, which is computed in step S1090.

When the specified projection plane differs from the user's desired projection plane (negative in step S1120), and when there is another candidate for the projection plane (affirmative in step S1130), the second button 85 is displayed as a button for instructing the display 8a to display the subsequent candidate. In response to an instruction input from the input device 6 including the mouse and the keyboard, processing in steps S1080 to S1110 is performed repetitively on the candidates one after another according to priority. The minimum distance is output to the display 8a, and the projection plane and the line segment indicating the minimum distance are rendered.

When all the specified projection planes differ from the user's desired projection plane (negative in S1130), in step S1140, the apparatus can enter a mode in which the projection plane is manually selected. By designating the selection button from among the first buttons 82 using the input device 6 including the mouse and the keyboard, the apparatus enters this mode. In step S1150, as in the related art, the user selects a plane parallel to a projection plane onto which the user wants to project the graphic elements. Alternatively, the user selects a line perpendicular to a projection plane onto which the user wants to project the graphic elements. Accordingly, the user's desired projection plane is selected, and the projection plane information is stored in the region 4d of the RAM 4.

Subsequently, the process returns to step S1080, and the above-described processing is performed. In the processing, the projection plane is the projection plane desired by the user. Thus, the minimum-distance computation command is terminated in step S1120. If the projection plane is incorrect due to erroneous operation by the user, or if the user wants to measure the minimum distance between the elements which are projected onto another projection plane, another projection plane can be specified in step S1140.

Hereinafter, a method for specifying the user's desired projection plane in accordance with the geometric information on the first and second graphic elements and the stored viewing direction, and, if there is a plurality of candidates, for prioritizing the candidates is described.

Unlike a known apparatus for making the user select the projection plane, the projection plane is automatically specified in the first embodiment. Unless the probability of the specified projection plane matching the user's desired projection plane is sufficiently high, the apparatus in the first embodiment is not practical. In the first embodiment, the projection plane is specified according to a predetermined rule by referring to the geometric information on the two graphic elements and the stored viewing direction in order that the probability of concordance may be increased. The rule will now be described.

According to the following rule, a projecting direction is determined in accordance with the geometric information on the first and second graphic elements and the stored viewing direction. The determined projecting direction is a normal vector of the projection plane. Similarly, according to this rule, the position of the projection plane is determined in accordance with the geometric information on the first and second graphic elements and the stored viewing direction. The determined point is a point on the projection plane. In accordance with the determined normal vector of the projection plane and the determined point on the projection plane, the projection plane is specified. When there are two 180-degree-reversed directions (two directions in which direction vectors have the opposite signs), such as the normal directions of a plane or a direction parallel to a line, the direction that produces a smaller angle with the viewing direction is always selected.

Rule for Determining Projecting Direction

In accordance with each graphic element, a projection reference is defined as follows:

(1) When the graphic element is a point, the point is used as the projection reference. When the graphic element is a sphere, the central point of the sphere is used as the projection reference;
(2) When the graphic element does not correspond to (1) and is an element included in a single line, that is, a line or a line segment, the single line is used as the projection reference;
(3) When the graphic element does not correspond to (1) and (2) and is an arc or part of an arc, a line which is perpendicular to a plane including the arc and which passes through the central point of the arc is used as the projection reference;
(4) When the graphic element does not correspond to (1) to (3) and is a plane figure included in a single plane, an arbitrary line perpendicular to the single plane is used as the projection reference;
(5) When the graphic element does not correspond to (1) to (4) and is part of a body of revolution, the central axis of revolution is used as the projection reference; and
(6) When the graphic element does not correspond to (1) to (5), no projection reference is defined.

A projection reference for a first graphic element is referred to as a projection reference 1, and a projection reference for a second graphic element is referred to as a projection reference 2. When the projection reference 1 is a line, a first projecting direction (hereinafter referred to as a projecting direction 1) is a direction parallel to the projection reference 1. When the projection reference 1 is a point, the projecting direction 1 does not exist.

When the projection reference 1 and the projection reference 2 have a common point, a second projecting direction (hereinafter referred to as a projecting direction 2) includes the normal directions of all the planes N including the projection references 1 and 2. When the projection reference 1 and the projection reference 2 have no common point, L represents a line segment connecting the projection references 1 and 2 over the minimum distance, and the projecting direction 2 includes the normal directions of all the planes M including the projection reference 1 and the line segment L. When there are innumerable projection references 2 satisfying the condition, the projection reference 2 which makes the smallest angle with the viewing direction is used as the projection reference 2.

The common point has the same meaning as in general geometry, i.e., "of all the points in space, a set of points included in two space figures". The relationship between two figures which never intersect each other or which are never included in each other, such as two parallel planes or two parallel lines, is described as "having no common point". In contrast, the relationship between two figures which intersect each other or which are included in each other, such as a plane and a line which passes through the plane or a plane and a line which is on the plane, is described as "having a common point". As described above, a "line segment" is a line with finite ends and is distinguished from a "line", which is an infinitely long line.

Rule for Prioritizing a Plurality of Candidates

A higher priority is assigned to the projecting direction which produces a smaller angle with the viewing direction.

Rule for Determining Position of Projection Plane

In accordance with each projection plane specified under the above conditions, the projection plane is located at a position including a point on one figure, of the two selected figures, which is finite in the corresponding projecting direction, and a point which is at the farthest relative to the projecting direction.

Hereinafter the projection reference and the projecting direction 1 of each graphic element will now be described in detail. As described in "Rule for determining projecting direction", in the classification into (1) to (6), a point can be considered as a sphere with a radius of zero; an arc can be considered as a body of revolution with a height of zero; and a line/line segment can be considered as a body of revolution with a radius of zero. Thus, graphic/elements can be classified into three elements, namely, "sphere", "plane", and "body of revolution". For each graphic element, the projection reference is: projection reference for "sphere": central point; projection reference for "plane": all lines (normal lines) orthogonal to plane (innumerable lines in the same direction) (hereinafter referred to as "all the normal lines"); and projection reference for "body of revolution": a single line including the central axis (hereinafter referred to as a central line).

The projecting direction 1 is, as described in "Rule for determining projecting direction", determined as: projecting direction 1 of "sphere": does not exist since projection reference is a point; projecting direction 1 of "plane": normal direction of plane (single direction is determined); and projecting direction 1 of "body of revolution": direction of central axis (single direction is determined).

In the following description, the first graphic element is a sphere 1, a plane 1, or a body of revolution 1, and the projection reference for the first graphic element is a central point 1, all the normal lines 1, or a central line 1; and the second graphic element is a sphere 2, a plane 2, or a body of revolution 2, and the projection reference for the second graphic element is a central point 2, all the normal lines 2, or a central axis 2. In accordance with the corresponding combinations, the positional relationships in space are divided into cases. A process for determining the projecting direction 2 will now be described.

Cases in which the projection reference 1 and the projection reference 2 of the two graphic elements have a common point will be described in accordance with the "Rule for determining projecting direction" in which "all the planes N including both the projection references 1 and 2", "normal direction of each plane N", and "projecting direction 2" are determined in this order.

Combination 1-1-1 (Sphere 1 and Sphere 2) (see FIGS. 4A to 4D)

Since the central point, which is the projection reference 1 for the sphere 1, and the central point 2, which is the projection reference 2 for the sphere 2, have a common point, the central point 1 and the central point 2 coincide with each other. In this case, the planes N are all the planes including the coincident point. Thus, the normal directions of the planes N are all the directions, and the projecting direction 2 of the sphere 1 is determined as the same direction as the viewing direction.

Figure 4A:
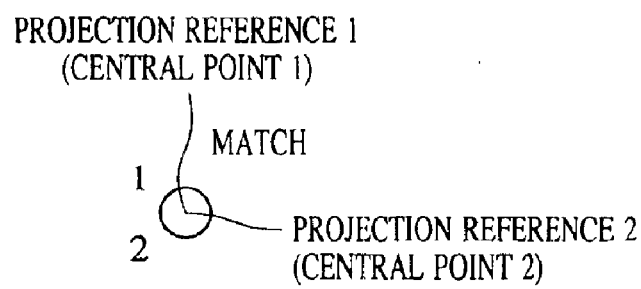
FIGS. 4A to 4D illustrate a specific example of a combination in which a first graphic element is a sphere and a second graphic element is a sphere.
Figure 4B:
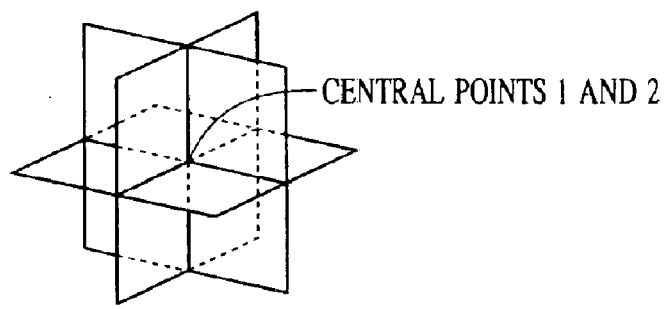
Figure 4C:
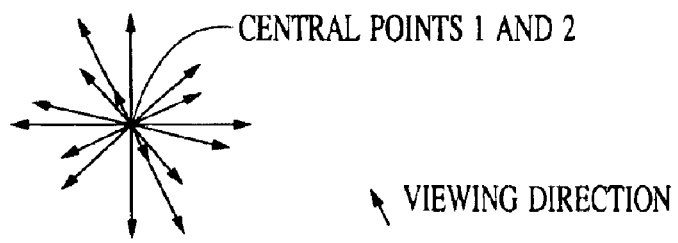
Figure 4D:
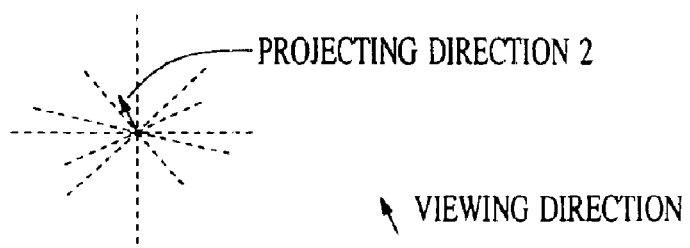

FIG. 4A illustrates the projection references 1 and 2 for the sphere 1 and the sphere 2. FIG. 4B illustrates all the planes N including both the projection reference 1 and the projection reference 2. FIG. 4C illustrates the normal directions of all the planes N. FIG. 4D illustrates the projecting direction 2.

Combination 1-1-2 (sphere 1 and plane 2) (see FIGS. 5A to 5D)

The central point 1, which is the projection reference 1 for the sphere 1, and one of the normal lines 2, which are the projection references 2 for the plane 2, have a common point. In this case, the planes N are all the planes including the normal line, of all the normal lines 2, which includes the central point 1. Thus, the planes N are all the planes which include the central point 1 and which are perpendicular to the plane 2. Thus, the normal directions of the planes N are all the directions parallel to the plane 2. Of all the directions parallel to the plane 2, the projecting direction 2 of the sphere 1 is determined as a direction which is closest to the viewing direction.

Figure 5A:
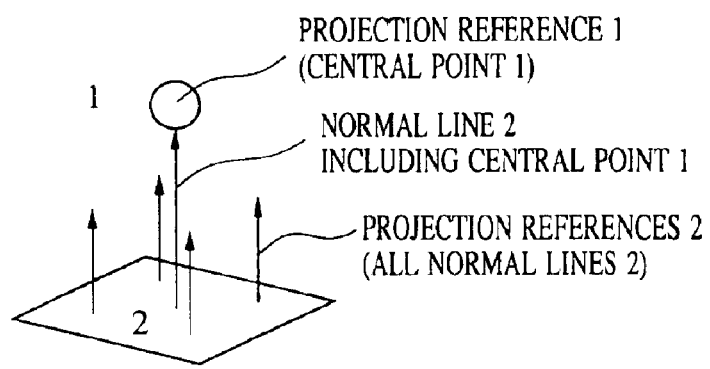
FIGS. 5A to 5D illustrate a specific example of a combination in which the first graphic element is a sphere and the second graphic element is a plane.
Figure 5B:
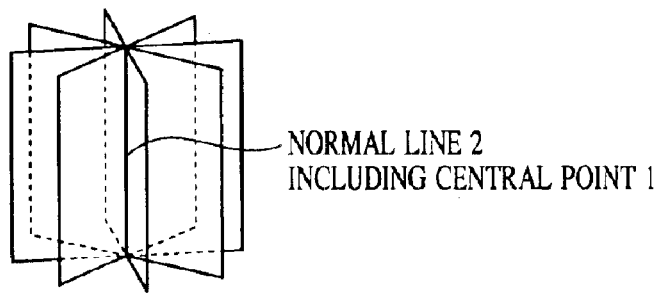
Figure 5C:
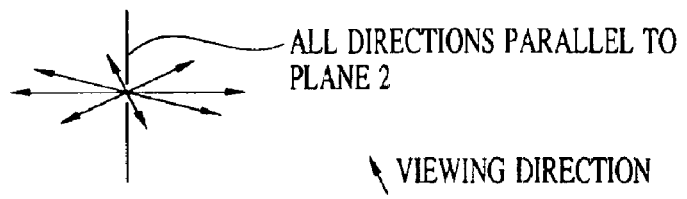
Figure 5D:
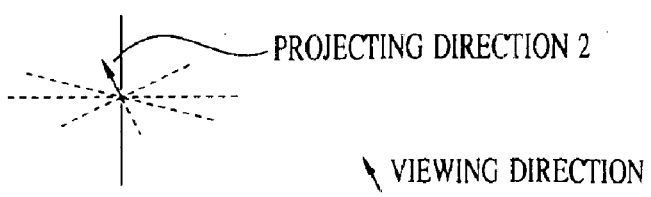

FIG. 5A illustrates the projection reference 1 for the sphere 1 and the projection references 2 for the plane 2. FIG. 5B illustrates all the planes N including both the projection reference 1 and the projection references 2. FIG. 5C illustrates all the normal directions of the planes N. FIG. 5D illustrates the projecting direction 2.

Combination 1-1-3 (Sphere 1 and Body of Revolution 2) (see FIGS. 6A to 6D)

Since the central point 1, which is the projection reference 1 for the sphere 1, and the central line 2, which is the projection reference 2 for the body of revolution 2, have a common point, the central point 1 is on the central line 2. In this case, the planes N are all the planes including the central line 2. Thus, the normal directions of the planes N are all the directions perpendicular to the central line 2. Of all the directions perpendicular to the central line 2, the projecting direction 2 of the sphere 1 is determined as a direction which is closest to the viewing direction.

Figure 6A:
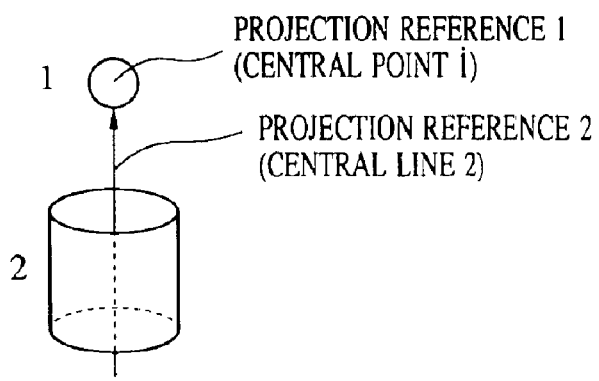
FIGS. 6A to 6D illustrate a specific example of a combination in which the first graphic element is a sphere and the second graphic element is a body of revolution.
Figure 6B:
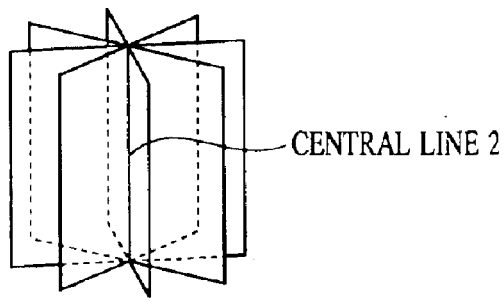
Figure 6C:
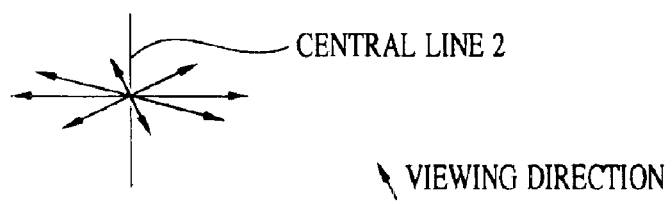
Figure 6D:
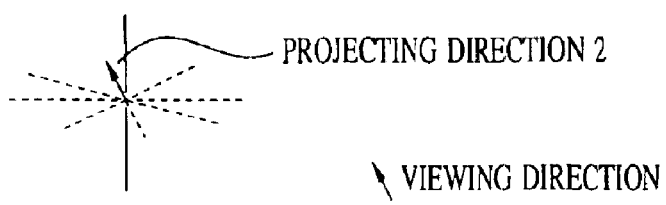

FIG. 6A illustrates the projection reference 1 for the sphere 1 and the projection reference 2 for the body of revolution 2. FIG. 6B illustrates all the planes N including both the projection reference 1 and the projection reference 2. FIG. 6C illustrates all the normal directions of the planes N. FIG. 6D illustrates the projecting direction 2.

Combination 1-2-1 (Plane 1 and Sphere 2; this Combination is the Same as that Shown in FIGS. 5A to 5D Although the Projection Reference 1 and the Projection Reference 2 are Interchanged)

One of all the normal lines 1, which are the projection references 1 for the plane 1, and the central point 2, which is the projection reference 2 for the sphere 2, have a common point. In this case, the planes N are all the planes including one of all the normal lines 1 and the central point 2. Thus, the planes N are all the planes which include the central point 2 and which are perpendicular to the plane 1. Accordingly, the normal directions of the planes N are all the directions parallel to the plane 1. Of all the directions parallel to the plane 2, the projecting direction 2 of the plane 1 is determined as a direction which is closest to the viewing direction.

Combination 1-2-2 (Plane 1 and Plane 2) (see FIGS. 7A to 7F)

One of all the normal lines 1, which are projection references 1 for the plane 1, and one of all the normal lines 2, which are projection references 2 for the plane 2, have a common point. In this case, the planes N are all the planes perpendicular to both the plane 1 and the plane 2. Thus, the normal directions of the planes N are all the directions parallel to both the plane 1 and the plane 2. Of all the directions parallel to both the plane 1 and the plane 2, the projecting direction 2 of the plane 1 is determined as a direction which is closest to the viewing direction.

Figure 7A:
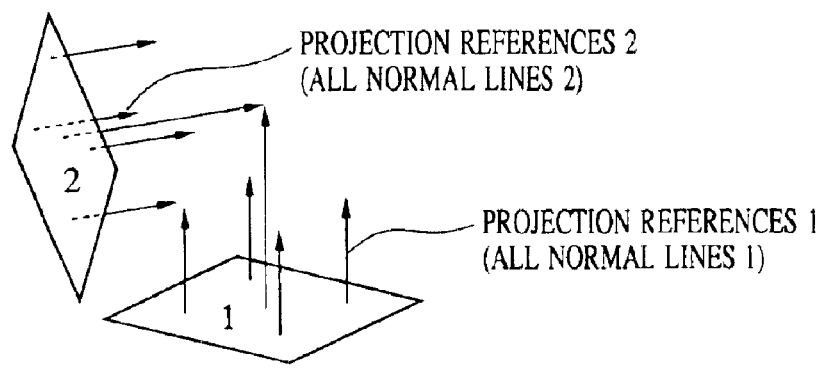
FIGS. 7A to 7F illustrate a specific example of a combination in which the first graphic element is a plane and the second graphic element is a plane.
Figure 7B:
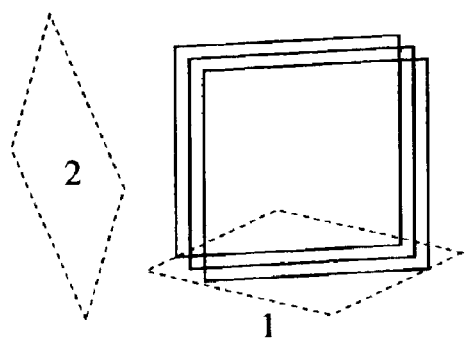
Figure 7C:
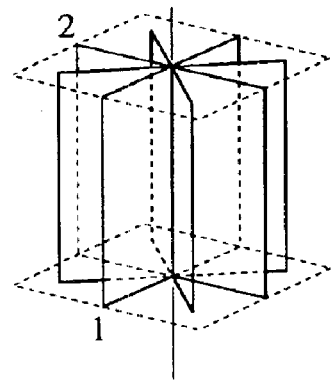
Figure 7D:
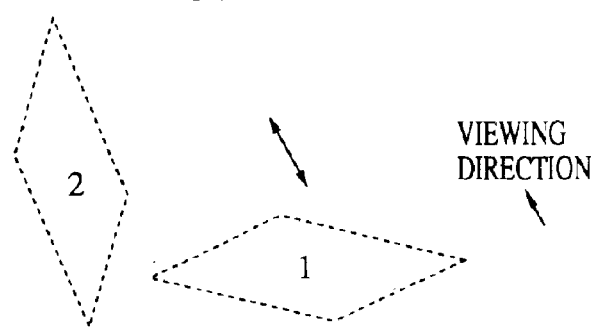
Figure 7E:
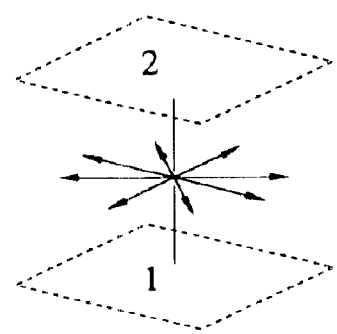
Figure 7F:
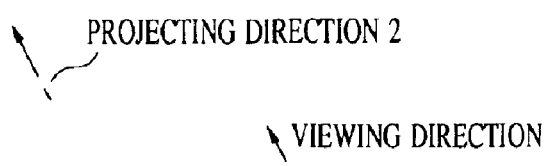

FIG. 7A illustrates the projection references 1 and 2 for the planes 1 and 2. FIG. 7B illustrates all the planes N including both the projection references 1 and 2. FIG. 7C illustrates all the planes N including both the projection references 1 and 2 when the planes 1 and 2 are parallel to each other. FIG. 7D illustrates all the normal directions of the planes N. FIG. 7E illustrates all the normal directions of the planes N when the planes 1 and 2 are parallel to each other. FIG. 7F illustrates the projecting direction 2.

Combination 1-2-3 (Plane 1 and Body of Revolution 2) (see FIGS. 8A to 8D)

One of all the normal lines 1, which are the projection references 1 for the plane 1, and the central line 2, which is the projection reference 2 for the body of revolution 2, have a common point. In this case, the planes N are all the planes including one of all the normal lines 1 and the central line 2. Thus, the planes N are all the planes which are perpendicular to the plane 1 and which include the central line 2. The normal directions of the planes N are all the directions which are parallel to the plane 1 and which are perpendicular to the central line 2 (there is only one normal direction unless the plane 1 and the central line 2 are orthogonal to each other). Of all the directions which are parallel to the plane 1 and which are perpendicular to the central line 2, the projecting direction 2 of the plane 1 is determined as a direction which is closest to the viewing direction.

Figure 8A:
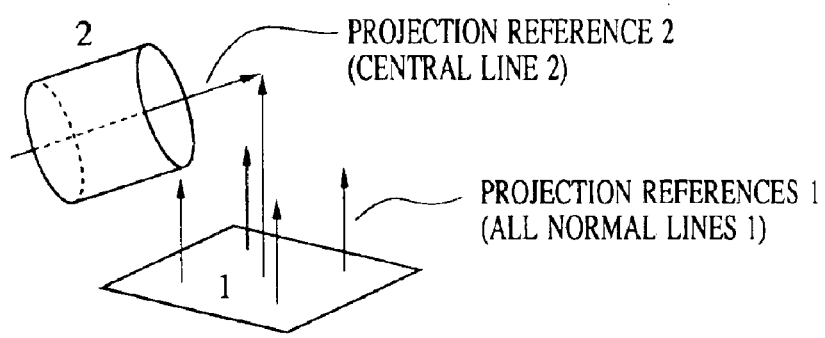
FIGS. 8A to 8D illustrate a specific example of a combination in which the first graphic element is a plane and the second graphic element is a body of revolution.
Figure 8B:
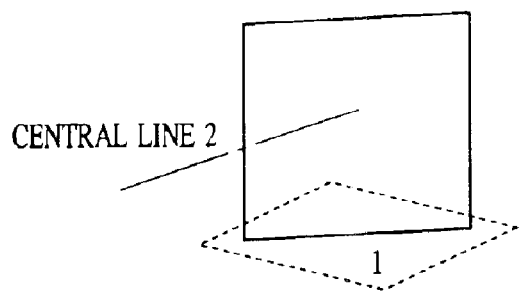
Figure 8C:
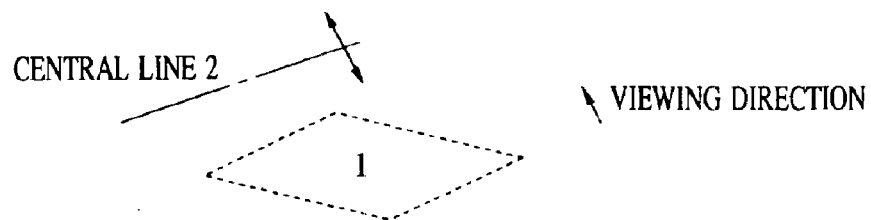
Figure 8D:
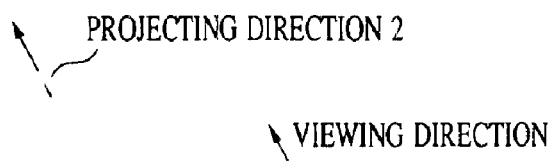

FIG. 8A illustrates the projection references 1 for the plane 1 and the projection reference 2 for the body of revolution 2. FIG. 8B illustrates all the planes N including both the projection reference 1 and the projection reference 2. FIG. 8C illustrates all the normal directions of the planes N. FIG. 8D illustrates the projecting direction 2.

Combination 1-3-1 (Body of Revolution 1 and Sphere 2; the Combination is the Same as that Shown in FIGS. 6A to 6D, Although the Projection Reference 1 and the Projection Reference 2 are Interchanged)

Since the central line 1, which is the projection reference 1 for the body of revolution 1, and the central point 2, which is the projection reference 2 for the sphere 2, have a common point, the central point 2 is on the central line 1. In this case, the planes N are all the planes including the central line 1. Thus, the normal directions of the planes N are all the directions perpendicular to the central line 1. Of all the directions perpendicular to the central line 1, the projecting direction 2 of the body of revolution 1 is determined as a direction which is closest to the viewing direction.

Combination 1-3-2 (Body of Revolution 1 and Plane 2; the Combination is the Same as that Shown in FIGS. 8A to 8D, Although the Projection Reference 1 and the Projection Reference 2 are Interchanged)

The central line 1, which is the projection reference 1 for the body of revolution 1, and one of all the normal lines 2, which are the projection references 2 for the plane 2, have a common point. In this case, the planes N are all the planes which include the central line 1 and which are perpendicular to the plane 2. Thus, the normal directions of the planes N are all the directions which are perpendicular to the central line 1 and which are parallel to the plane 2. Of all the directions which are perpendicular to the central line 1 and which are parallel to the plane 2, the projecting direction 2 of the body of revolution 1 is determined as a direction which is closest to the viewing direction.

Combination 1-3-3 (Body of Revolution 1 and Body of Revolution 2) (see FIGS. 9A to 9F)

The central line 1, which is the projection reference 1 for the body of revolution 1, and the central line 2, which is the projection reference 2 for the body of revolution 2, have a common point. Thus, the central line 1 and the central line 2 intersect each other or coincide with each other. In this case, the planes N are all the planes N including the central line 1 and the central line 2. Thus, the normal directions of the planes N are all the directions perpendicular to both the central line 1 and the central line 2. Of all the directions perpendicular to both the central line 1 and the central line 2, the projecting direction 2 of the body of revolution 1 is determined as a direction which is closest to the viewing direction.

Figure 9A:
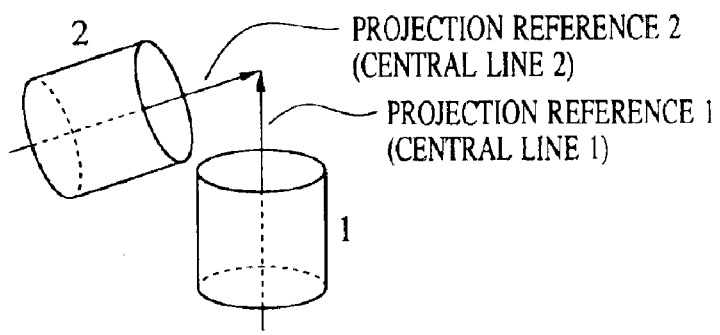
FIGS. 9A to 9F illustrate a specific example of a combination in which the first graphic element is a body of revolution and the second graphic element is a body of revolution.
Figure 9B:
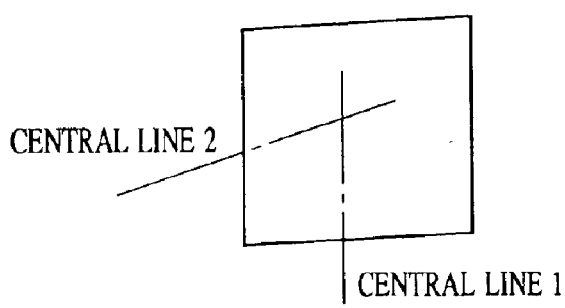
Figure 9C:
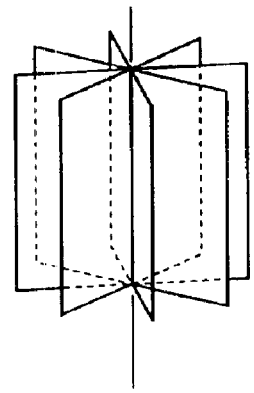
Figure 9D:
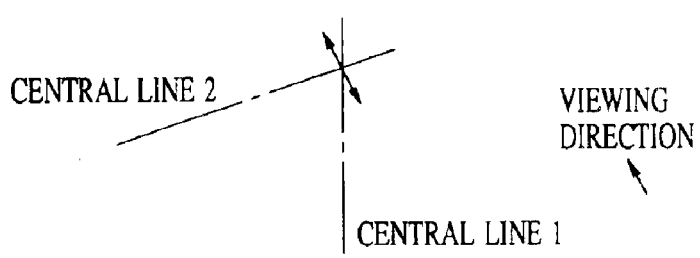
Figure 9E:
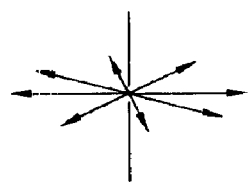
Figure 9F:
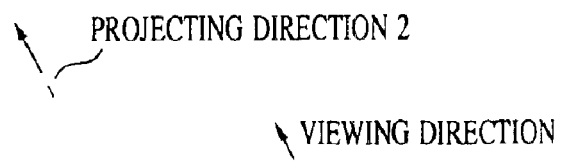

FIG. 9A illustrates the projection references 1 and 2 for the body of revolution 1 and the body of revolution 2. FIG. 9B illustrates all the planes N including both the projection reference 1 and the projection reference 2. FIG. 9C illustrates all the planes N including both the projection reference 1 and the projection reference 2 when the central line 1 and the central line 2 coincide with each other. FIG. 9D illustrates all the normal directions of the planes N. FIG. 9E illustrates all the normal directions of the planes N when the central line 1 and the central line 2 coincide with each other. FIG. 9F illustrates the projecting direction 2.

Hereinafter, cases in which the projection reference 1 and the projection reference 2 for the two graphic elements have no common point will be described in accordance with the "Rule for determining projecting direction" in which "line segment L connecting projection references 1 and 2 over the minimum distance", "all planes M including both projection reference 1 and line segment L", "normal directions of planes M", and "projecting direction 2" are determined in this order.

Combination 2-1-1 (Sphere 1 and Sphere 2) (see FIGS. 10A to 10D)

Since the central point 1, which is the projection reference 1 for the sphere 1, and the central point 2, which is the projection reference 2 for the sphere 2, have no common point, the central point 1 and the central point 2 do not coincide with each other. In this case, the line segment L is a line segment connecting the central point 1 and the central point 2. The planes M are all the planes including the line segment L. Thus, the planes M are all the planes including the central point 1 and the central point 2. Thus, the normal directions of the planes M are all the directions perpendicular to the line segment L. Of all the directions perpendicular to the line segment connecting the central point 1 and the central point 2, the projecting direction 2 of the sphere 1 is determined as a direction which is closest to the viewing direction.

Figure 10A:
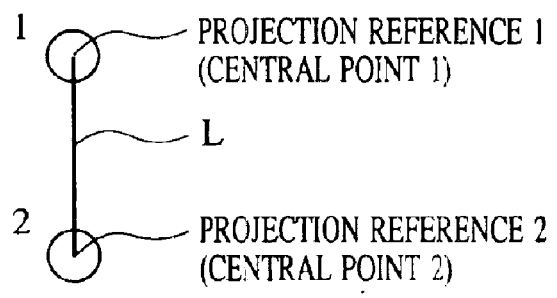
FIGS. 10A to 10D illustrate a specific example of a combination in which the first graphic element is a sphere and the second graphic element is a sphere.
Figure 10B:
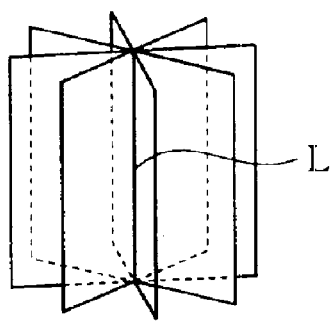
Figure 10C:
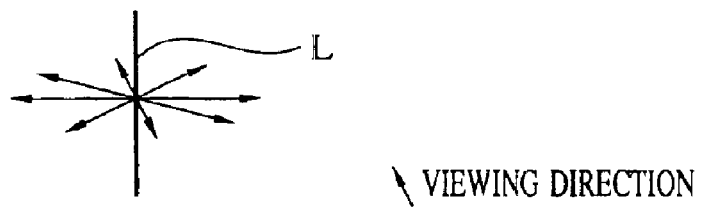
Figure 10D:
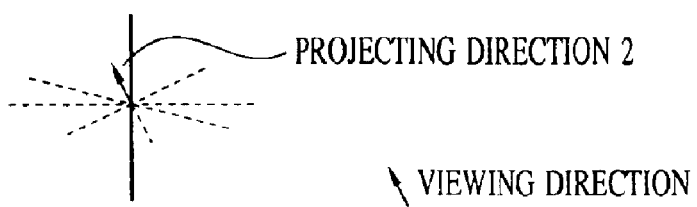

FIG. 10A illustrates the line segment L connecting the projection references 1 and 2 for the spheres 1 and 2 over the minimum distance. FIG. 10B illustrates all the planes M including both the projection reference 1 and the line segment L. FIG. 10C illustrates all the normal directions of the planes M. FIG. 10D illustrates the projecting direction 2.

Combination 2-1-2 (Sphere 1 and Plane 2)

The central point 1, which is the projection reference 1 for the sphere 1, and one of the normal lines 2, which are the projection references 2 for the plane 2, have a common point. Thus, this case is impossible.

Combination 2-1-3 (Sphere 1 and Body of Revolution 2) (see FIGS. 11A to 11D)

Since the central point 1, which is the projection reference 1 for the sphere 1, and the central line 2, which is the projection reference 2 for the body of revolution 2, have no common point, the central point 1 is not on the central line 2. In this case, the line segment L is a perpendicular line drawn from the central line 1 to the central line 2. The planes M are all the planes including the central point 1 and the line segment L. Thus, the normal directions of the planes M are all the directions perpendicular to the line segment L. Of all the directions perpendicular to the line segment L, the projecting direction 2 of the sphere 1 is determined as a direction which is closest to the viewing direction.

Figure 11A:
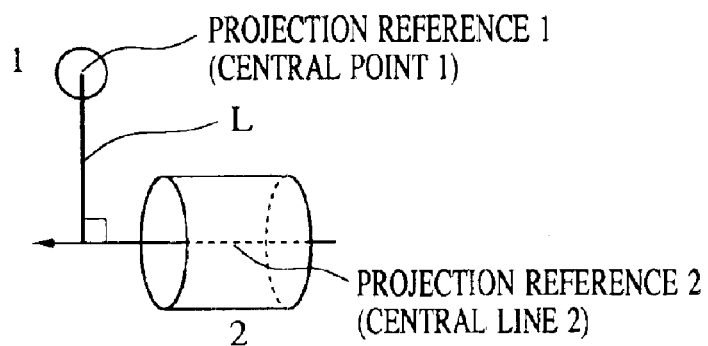
FIGS. 11A to 11D illustrate a specific example of a combination in which the first graphic element is a sphere and the second graphic element is a body of revolution.
Figure 11B:
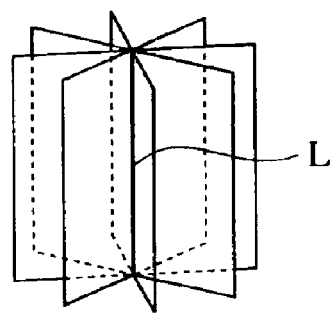
Figure 11C:
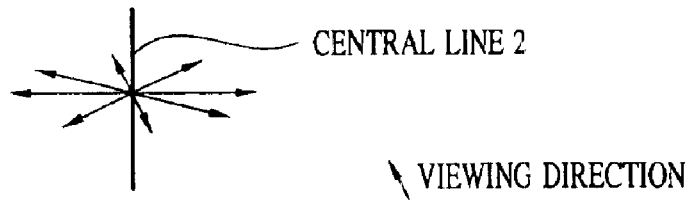
Figure 11D:
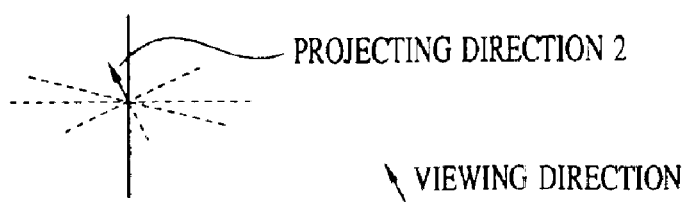

FIG. 11A illustrates the line segment L connecting the projection reference 1 for the sphere 1 and the projection reference 2 for the body of revolution 2 over the minimum distance. FIG. 11B illustrates all the planes M including both the projection reference 1 and the line segment L. FIG. 11C illustrates all the normal directions of the planes M. FIG. 11D illustrates the projecting direction 2.

Combination 2-2-1 (Plane 1 and Sphere 2)

One of the normal lines 1, which are the projection references 1 for the plane 1, and the central point 2, which is the projection reference 2 for the sphere 2, has a common point. Thus, this case is impossible.

Combination 2-2-2 (Plane 1 and Plane 2)

One of the normal lines 1, which are the projection references 1 for the plane 1, and one of the normal lines 2, which are the projection references 2 for the plane 2, have a common point. Thus, this case is impossible.

Combination 2-2-3 (Plane 1 and Body of Revolution 2)

One of the normal lines 1, which are the projection references 1 for the plane 1, and the central line 2, which is the projection reference 2 for the body of revolution 2, have a common point. Thus, this case is impossible.

Combination 2-3-1 (Body of Revolution 1 and Sphere 2) (see FIGS. 12A to 12D)

Since the central line 1, which is the projection reference 1 for the body of revolution 1, and the central point 2, which is the projection reference 2 for the sphere 2, have no common point, the central point 2 is not on the central line 1. In this case, the line segment L is a perpendicular line drawn from the central point 2 to the central line 1. Since the planes M are all the planes including the central line 1 and the line segment L, the planes M are all the planes including the central line 1 and the central point 2. Thus, the normal directions of the planes M are the normal directions of the planes including the central line 1 and the central point 2. Of the directions perpendicular to the planes including the central line 1 and the central point 2, the projecting direction 2 of the body of revolution 1 is determined as a direction which is closest to the viewing direction.

Figure 12A:
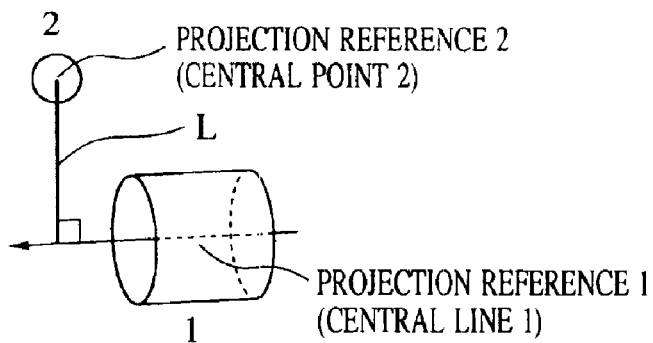
FIGS. 12A to 12D illustrate a specific example of a combination in which the first graphic element is a body of revolution and the second graphic element is a sphere.
Figure 12B:
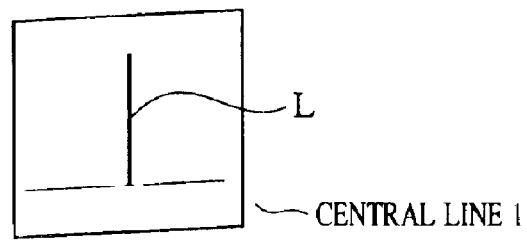
Figure 12C:
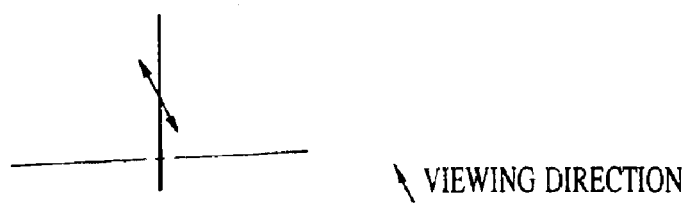
Figure 12D:
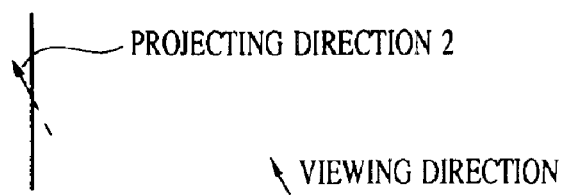

FIG. 12A illustrates the line segment L connecting the projection reference 1 for the body of revolution 1 and the projection reference 2 for the sphere 2 over the minimum distance. FIG. 12B illustrates all the planes M including both the projection reference 1 and the line segment L. FIG. 12C illustrates all the normal directions of the planes M. FIG. 12D illustrates the projecting direction 2.

Combination 2-3-2 (Body of Revolution 1 and Plane 2)

The central line 1, which is the projection reference 1 for the body of revolution 1, and one of the normal lines 2, which are the projection references 2 for the plane 2, have a common point. Thus, this case is impossible.

Combination 2-3-3 (Body of Revolution 1 and Body of Revolution 2) (see FIGS. 13A to 13D)

Since the central line 1, which is the projection reference 1 for the body of revolution 1, and the central line 2, which is the projection reference 2 for the body of revolution 2, have no common point, the central line 1 and the central line 2 are either skewed or parallel to each other. In this case, the line segment L is a line segment connecting the central line 1 and the central line 2 over the minimum distance (when the central lines 1 and 2 are parallel, the line segment L is a perpendicular line). The planes M are all the planes including the central line 1 and the line segment L (and the central line 2 when the central lines 1 and 2 are parallel). Thus, the normal directions of the planes M are directions perpendicular to both the central line 1 and the line segment L (and to the central line 2 when the central lines 1 and 2 are parallel). Of all the directions perpendicular to both the central line 1 and the line segment L (and to the central line 2 when the central lines 1 and 2 are parallel) (when projected in these directions, the two central lines are projected parallel to each other), the projecting direction 2 of the body of revolution 1 is determined as a direction which is closest to the viewing direction.

Figure 13A:
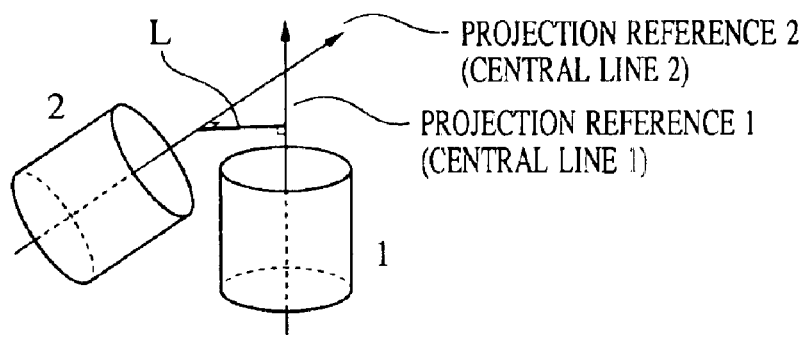
FIGS. 13A to 13D illustrate a specific example of a combination in which the first graphic element is a body of revolution and the second graphic element is a body of revolution.
Figure 13B:
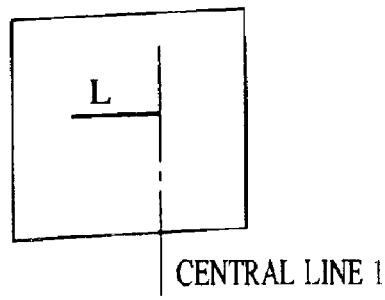
Figure 13C:
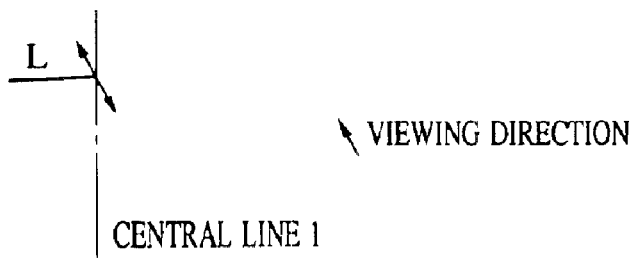
Figure 13D:
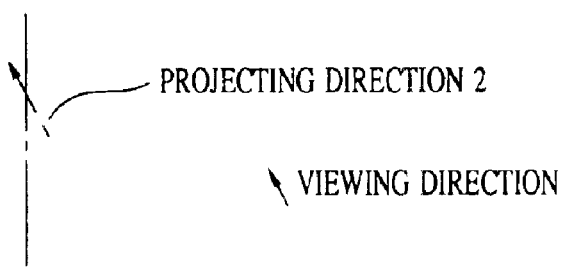

FIG. 13A illustrates the line segment L connecting the projection references 1 and 2 for the body of revolution 1 and the body of revolution 2 over the minimum distance. FIG. 13B illustrates all the planes M including both the projection reference 1 and the line segment L. FIG. 13C illustrates all the normal directions of the planes M. FIG. 13D illustrates the projecting direction 2.

FIGS. 14A and 14B are tables summarizing the above combinations.

When graphic elements, such as a line, an arc, a closed plane, and a body of revolution rendered in the three-dimensional space, are projected in a direction parallel to the projection reference defined in the "Rule for determining projecting direction" (projecting direction 1) or in a direction perpendicular to the projection reference defined in the "Rule for determining projecting direction" (projecting direction 2), the graphic elements are projected as simple figures, such as a point, an arc, a line, and a polygon. It is highly likely that stereographic figures (rendered components) including these graphic elements are rendered so that the direction parallel to the projection reference (projecting direction 1) is regarded as a "front direction" (or "side direction"), and the direction perpendicular to the projection reference (projecting direction 2) is regarded as a "side direction" (or "front direction"). It is highly likely that the user wants to project these elements in one of these directions.

Since the directions perpendicular to the projection reference (projecting directions 2) are infinite, reference is made to the positional relationship with the other graphic element. Of directions which are highly likely to be the "side directions" (or "front directions") of one graphic element, the direction which is highly likely to be the "front direction" (or "side direction") of the other graphic element is selected. As a result, the optimum direction is specified. Accordingly, the projecting direction, which is specified in the foregoing manner, has a sufficiently high probability of coinciding with the user's desired projection plane in practical terms, if it is within the estimation range based on the geometric information on the two graphic elements and the viewing direction.

Whether the user wants to project the elements in the front direction or in the side direction can be determined, with a high degree of probability, by referring to the user's viewing direction. This is illustrated in FIGS. 15A and 15B. Two graphic elements of two components are selected. When the command for computing the minimum distance between the two graphic elements is executed while the graphic elements are displayed in the viewing direction shown in FIG. 15A, it is likely that the user wants to project the graphic elements in the direction perpendicular to the projection reference (side direction). In contrast, when the command for computing the minimum distance between the two graphic elements is executed while the graphic elements are displayed in the viewing direction shown in FIG. 15B, it is likely that the user wants to project the graphic elements in the direction parallel to the projection reference (front direction). When there is a plurality of candidates for the projecting direction, the direction which is closer to the viewing direction, that is, the direction which produces a smaller angle with the viewing direction, is given a higher priority. Thus, the probability of the projecting direction matching the user's desired projecting direction is further increased.

FIG. 16 illustrates an example of the displayed measurement result. The projection plane is displayed so as to coincide with the graphic element, of the first graphic element and the second graphic element, which is farther from the view point when viewed from the viewing direction. Unlike a case in which the projection plane is determined without taking into consideration the geometric information and the viewing direction, in the first embodiment, the projection plane is displayed at a position including the farthest point in the projecting direction, which is determined by taking into consideration the geometric information on the first and second graphic elements and the viewing direction. Thus, the projection plane, the projection result, and the measurement result are displayed in the background at the back side of the two components to be measured. Thus, visibility is improved for the user.

With the foregoing advantages, it is possible to provide the highly-usable graphics processing apparatus and method having a function for computing, with a high degree of probability, the minimum distance between graphic elements projected in a direction, which is required by the user, without making the user select a projection plane.

Second Embodiment

Figure 17:
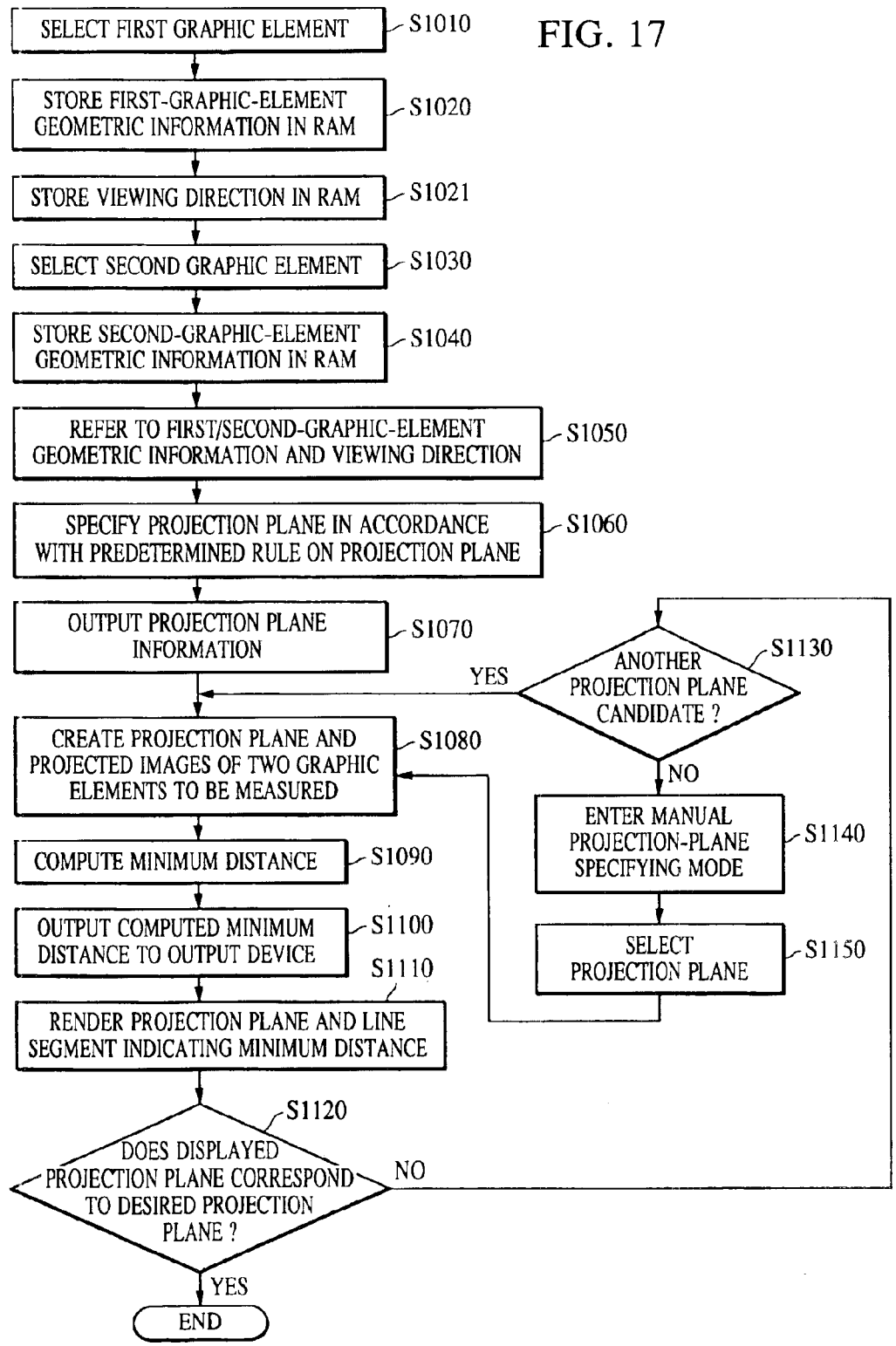
FIG. 17 is a flowchart showing a process of computing the distance between graphic elements according to a second embodiment of the present invention.

Referring to a flowchart shown in FIG. 17, a second embodiment of the present invention will now be described. Although a process similar to that in the first embodiment is performed in the second embodiment, the process in the second embodiment differs from that in the first embodiment in the following respects:

In the first embodiment, in step S1000, the viewing direction at the time the apparatus enters the minimum-distance computation mode in which the distance between graphic elements is computed is stored in the storage region 4a of the RAM 4. In the second embodiment, in step S1021, the viewing direction at the time the first graphic element is selected is stored in the storage region 4A of the RAM 4.

In the first embodiment, the viewing direction to be input for determining the projection plane is the viewing direction at the time the apparatus enters the minimum-direction computation mode in which the minimum distance between graphic elements is computed. In the second embodiment, the viewing direction to be input for determining the projection plane is the viewing direction at the time the first graphic element is selected.

Depending on the shape of a graphic element to be processed by the user, when the probability of the projection plane (i.e., the projection plane determined by the process in the second embodiment) matching the user's desired projection plane is increased, the process in the second embodiment may be employed. Alternatively, the viewing direction at the time the second graphic element is selected may be used as the viewing direction to be input for determining the projection plane. If the probability of the determined projection plane coinciding with the user's desired projection plane is increased, an advantage similar to that of the second embodiment can be achieved.

Figure 18:
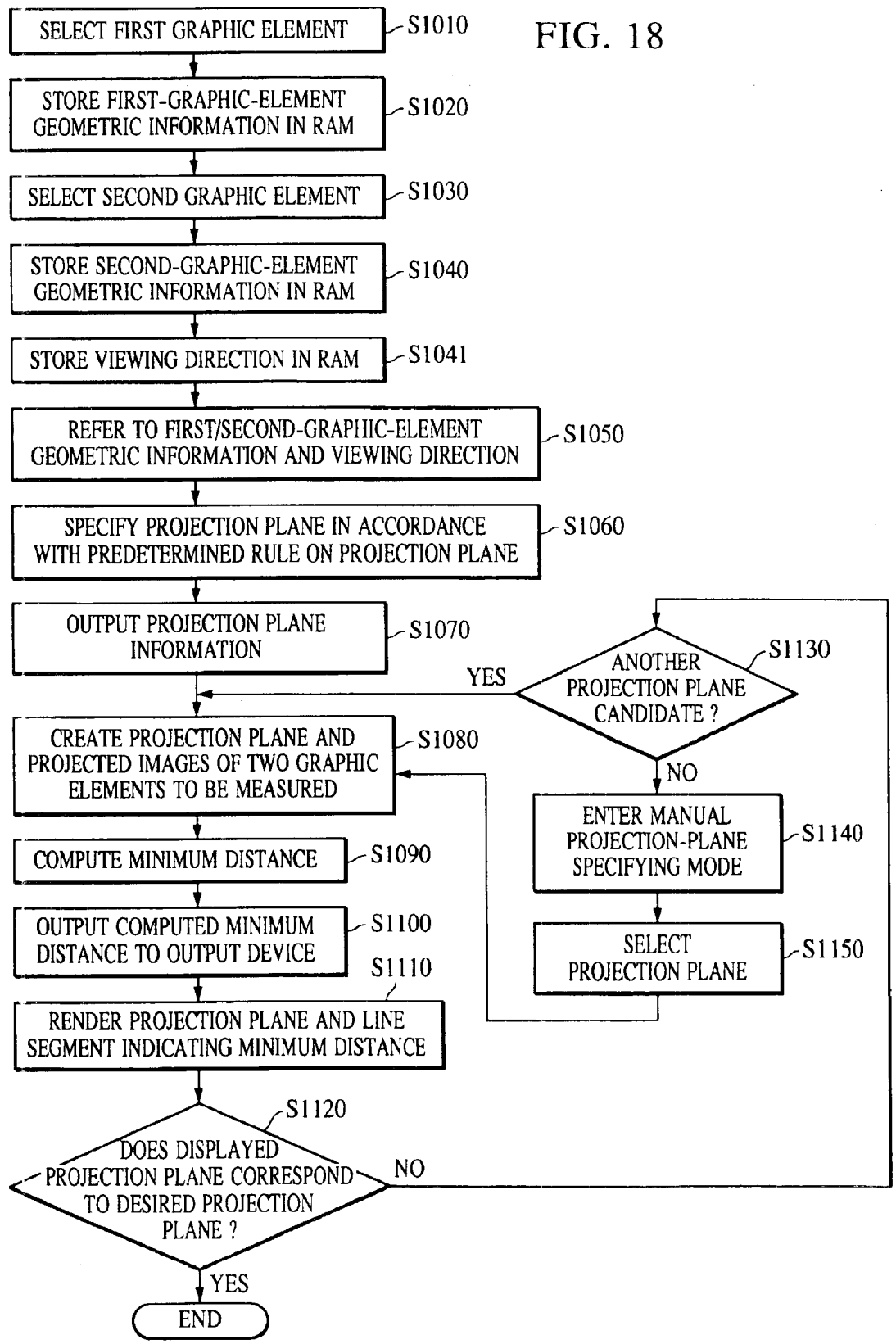
FIG. 18 is a flowchart showing a process of computing the distance between graphic elements according to a third embodiment of the present invention.

FIG. 18 is a flowchart showing the process in the second embodiment. In step S1041, the viewing direction at the time the second graphic element is selected is stored in the storage region 4a of the RAM 4. In addition, the user may be allowed to set the time at which the viewing direction is selected using a soft key.

Third Embodiment

Figure 19A:
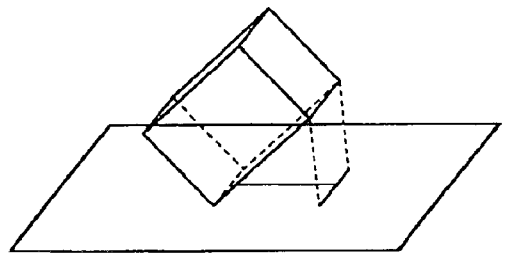
FIGS. 19A and 19B illustrate examples of the measurement results displayed on a display in the third embodiment.
Figure 19B:
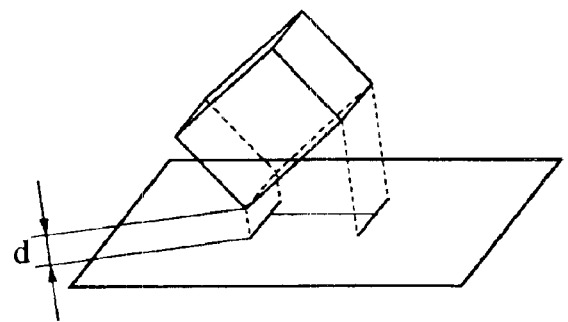

Referring to FIGS. 19A and 19B, a third embodiment of the present invention will now be described. Although a process similar to that in the first embodiment is performed in the third embodiment, the process in the third embodiment differs from that in the first embodiment in the following respects:

In the third embodiment, the foregoing "rule for determining position of projection plane", which is part of the rule for specifying the projection plane in the first embodiment, is changed as follows:

Rule for Determining Position of Projection Plane in the Third Embodiment

In accordance with each of the specified projecting directions, the projection plane is located at a position farther, by a distance d, from a position including a point on one figure, of two selected figures, which is finite in the corresponding projecting direction, and a point which is at the farthest relative to the projecting direction.

FIGS. 19A and 19B show the displayed results in the third embodiment. These displayed results differ from the displayed result shown in FIG. 16. Specifically, in FIG. 16, the projection plane is displayed so as to coincide with the graphic element, of the first and second graphic elements, which is farther from the view point when viewed from the viewing direction, and the projection plane is displayed. In FIG. 19B, the projection plane is moved farther by a distance d in the projecting direction, and the projection plane is displayed.

Referring to FIG. 19A, the graphic element farther from the view point when viewed from the viewing direction is completely included in the projection plane. Instead of making, as in FIG. 16, the projection plane coincide with the graphic element at the back, the projection plane is moved, as in FIG. 19B, farther from the view point by a distance d, which is an appropriate distance computed from the geometric information on the first and second graphic elements and the relative distance therebetween, and the projection plane is displayed. In the latter case, visibility for the user may be further improved. In FIG. 19B, d is one third of the relative distance between the first and second graphic elements.

Fourth Embodiment

Figure 20:
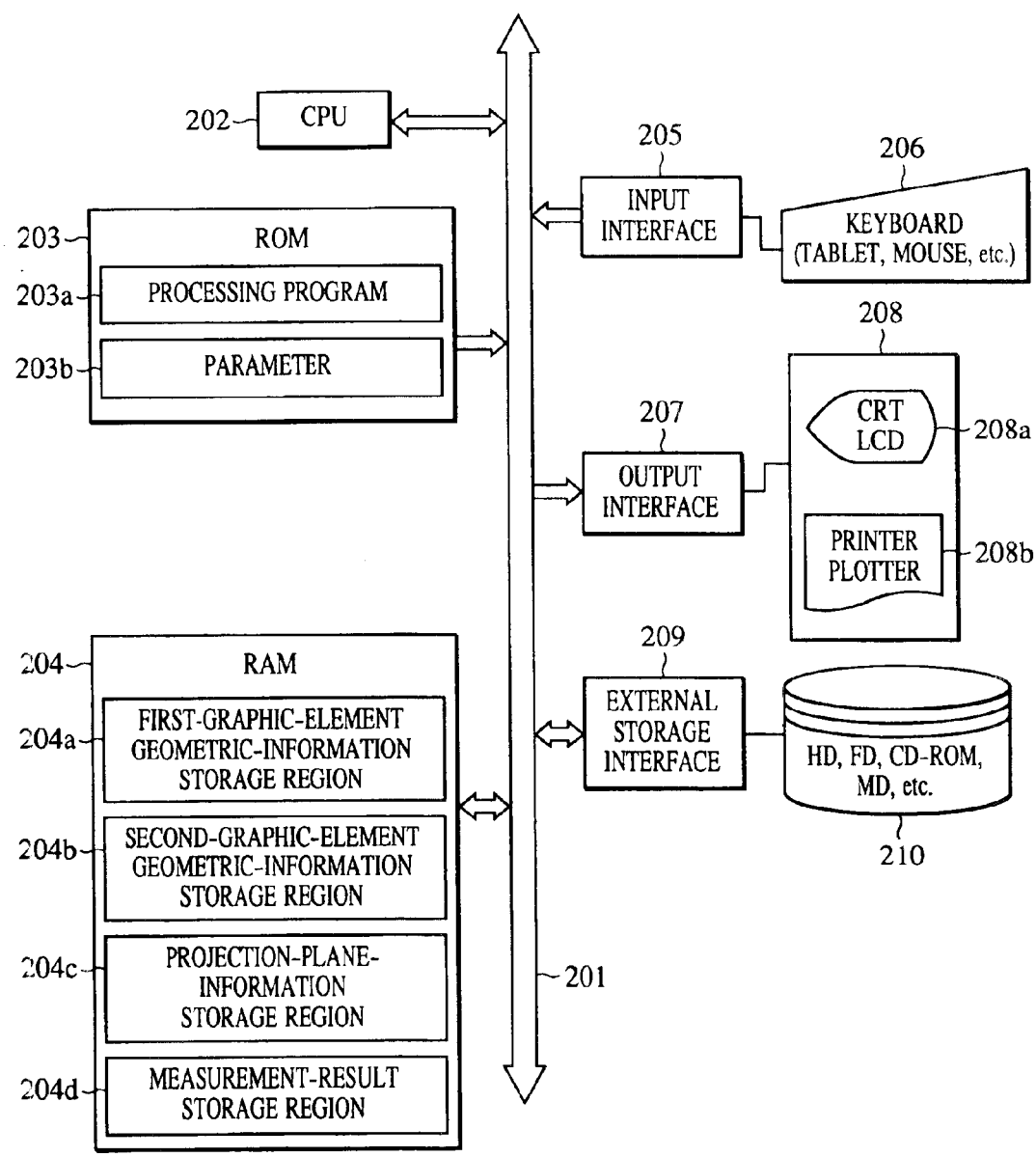
FIG. 20 is a block diagram of a graphics processing apparatus according to a fourth embodiment of the present invention.

FIG. 20 is a block diagram showing the configuration of a graphics processing apparatus according to a fourth embodiment of the present invention. The graphics processing apparatus contains a bus 201, which includes a control line, a data line, and an address line. A CPU 202, a ROM 203, and a RAM 204 are connected to the bus 201. An input device 206, such as a keyboard, a tablet, a mouse, etc., is connected through an input interface 205 to the bus 201. An output device 208 is connected through an output interface 207 to the bus 201. An external storage device 210 is connected through an external storage interface 209 to the bus 201. The output device 208 is formed by a display output device 208a, such as a CRT or an LCD, and a print output device 208b, such as a printer or a plotter. The external storage device 210 is formed by magnetic disks, such as a hard disk (HD), a floppy disk (FD), a CD-ROM, a mini disk (MD), etc., and a magnetic tape.

The CPU 202 controls the overall apparatus. The ROM 203 stores a processing program 203a and a parameter 203b. The RAM 204 includes a first-graphic-element geometric-information storage region 204a, a second-graphic-element geometric-information storage region 204b, a projection-plane-information storage region 204c, a measurement-result storage region 204d, and a graphic-element storage region (not shown). In accordance with the processing program 203a stored in the ROM 203, the CPU 202 uses the RAM 204 as a temporary storage device and performs various control processes, such as graphic input control, graphic display control, picking processing, and computation of the distance between elements. The display 208a includes a plurality of bit map planes according to need and displays a graphic image.

Figure 21:
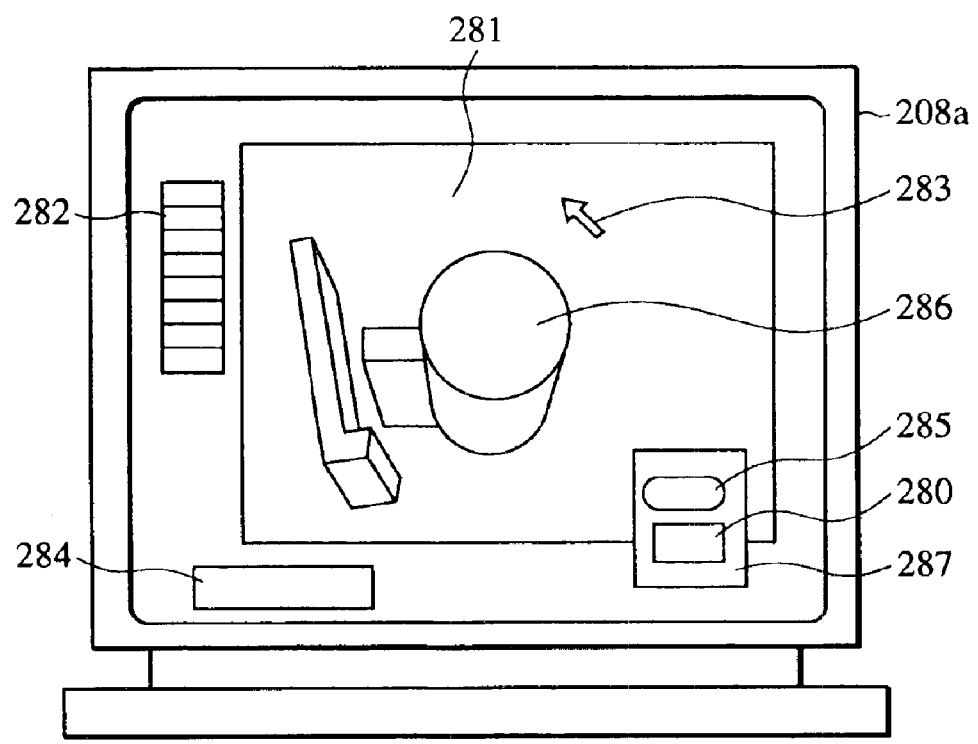
FIG. 21 illustrates an example of a window displayed on a display shown in FIG. 20.

FIG. 21 illustrates an example of an image displayed on the display 208a shown in FIG. 20. The display 208a includes a graphic display area 281, first buttons 282, a mouse pointer 283, a first information output area 284, a panel 287, a second button 285 on the panel 287, a second information output area 280 on the panel 287, and three-dimensional graphic elements 286. All of these buttons are soft keys. In the graphic display area 281, the three-dimensional graphic elements 286 are displayed in accordance with graphic elements stored in the graphic-element storage region (not shown) of the RAM 204.

On the display 208a, the minimum distance between the displayed three-dimensional graphic elements 286 is interactively computed by operating the input device 206 including the keyboard, the mouse, etc. Using the mouse pointer 283 and the input device 206, an appropriate position on the first buttons 282 is selected. Thus, the graphics processing apparatus enters a mode in which the minimum distance between elements is computed.

Figure 22:
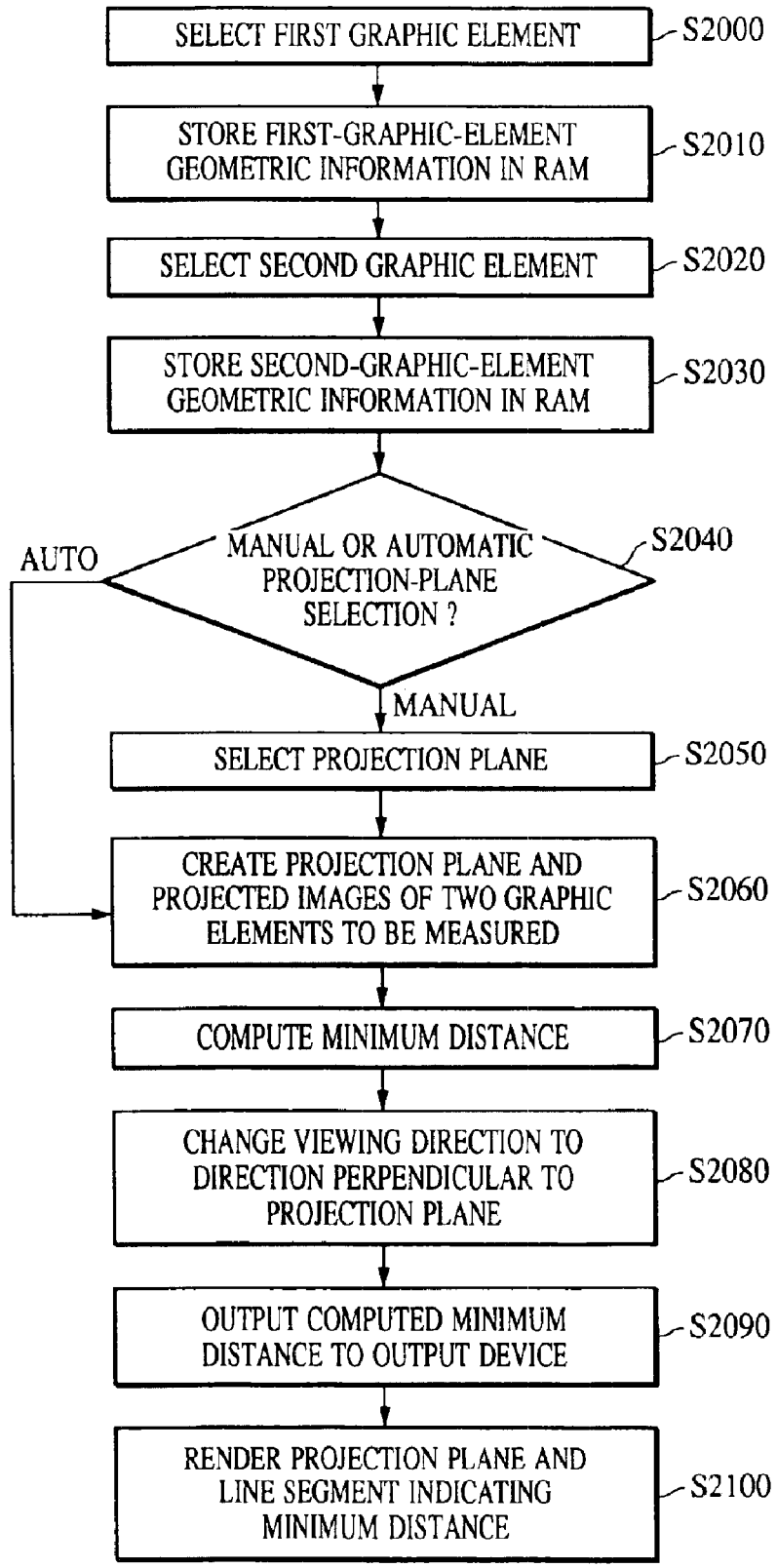
FIG. 22 is a flowchart showing a process according to the fourth embodiment, which is performed by the graphics processing apparatus shown in FIG. 20.

In accordance with a flowchart shown in FIG. 22, a process of computing the minimum distance between graphic elements in the fourth embodiment will now be described.

In response to an input from the keyboard or by moving the mouse pointer 283 using the mouse, the mode in which the minimum distance between graphic elements is computed is selected from among the first buttons 282.

In response to the instruction, the apparatus enters the minimum-distance computation mode. In step S2000, a first graphic element (point, edge line, plane, arc, etc.), which is a measurement object desired by the user, is selected by operating the input device 206 including the mouse, the keyboard, etc. In order to prevent an erroneous selection and to improve the operating efficiency, a filtering function for making the user designate beforehand attributes (types including point, line, plane, arc, etc.) of graphic elements the user wants to select can be provided so that only graphic elements having the corresponding attributes are selectable, or a filtering function for making the user designate beforehand a component containing graphic elements the user wants to select is provided so that only graphic elements included in the corresponding component are selectable.

When graphic elements to be selected are disposed at positions at which the graphic elements are hard to see, an interruption function may be provided. Specifically, the user can interrupt the process and insert an operation to freely change the position of a view point or the viewing direction using the input device 206, e.g., the mouse. Also, an imaginary element selecting function may be provided. Specifically, to allow the user to select an imaginary point, such as the center of an arc or the midpoint of a line segment, or an imaginary line, such as the center of a circular cylindrical plane, the selection of an arc causes the apparatus to perform processing as if the central point of the arc had been selected; the selection of a line segment causes the apparatus to perform processing as if the midpoint of the line segment had been selected; and the selection of a circular cylindrical plane causes the apparatus to perform processing as if the central axis of the circular cylindrical plane had been selected.

In step S2010, geometric information on the selected first graphic element is stored in the first-graphic-element geometric-information storage region 204a of the RAM 204. The geometric information includes parameters required for uniquely determining a space figure, that is, numeric values indicating coordinates of a point, an end point, and a vertex, and the radius of a circle in accordance with a graphic figure, such as a point, a line, an arc, a plane, a circular cylindrical plane, etc.

In step S2020, a second graphic object, which is a measurement object desired by the user, is selected by operating the input device 206, e.g., the mouse, the keyboard, etc. In this case, as in step S2000, the foregoing filtering functions, the interruption function, and the imaginary element selecting function may be provided.

In step S2030, geometric information on the selected second graphic element is stored in the second-graphic-element geometric-information storage region 204b of the RAM 204.

In step S2040, the process prompts the user to select whether to perform automatic projection-plane selection or manual projection-plane selection through the panel 287 or the second information output area 280. The user uses the input device 206 to move the mouse pointer 283 to the second button 285 on the panel 287.

When the user selects manual selection in step S2040, the process proceeds to step S2060.

In step S2050, the user uses the input device 206 to move the mouse pointer 283 and selects the user's desired projection plane. The selected projection plane is stored in the projection-plane-information storage region 204c of the RAM 204.

When the user selects automatic selection in step S2040, a plane, such as the xy plane, the yz plane, or the xz plane, which is set in advance in the command, is used as the projection plane, and the projection plane is stored in the projection-plane-information storage region 204c of the RAM 204.

In step S2060, the projection plane determined in step S2040 or in step S2050 is created, and projected images of the two selected graphic elements to be measured are created on the projection plane.

In step S2070, the minimum distance between the two graphic elements, which are projected in step S2060, is computed.

In step S2080, an angle formed by a direction perpendicular to the projection plane and the viewing direction is computed. By rotating the viewing direction by the computed angle, the viewing direction is changed to the direction perpendicular to the projection plane.

In step S2090, a numeric value indicating the minimum distance, which is computed in step S2070, is output to the display 208.

In step S2100, a line segment indicating the minimum distance and the projection plane are rendered in accordance with information on the minimum distance, which is computed in step S2070.

Figure 23A:
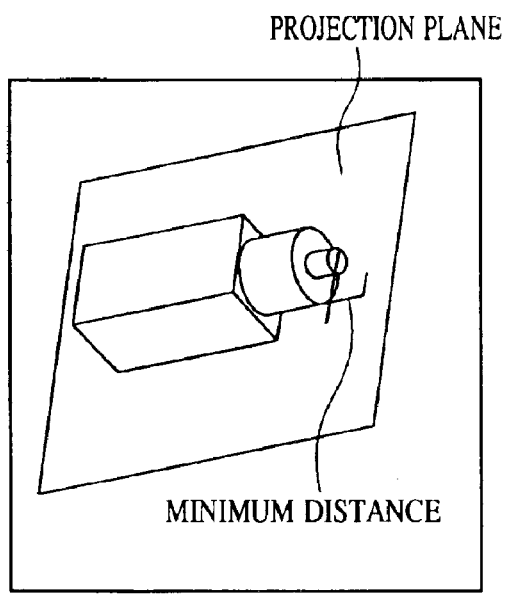
FIGS. 23A and 23B illustrate examples of images displayed on the display shown in FIG. 20.
Figure 23B:
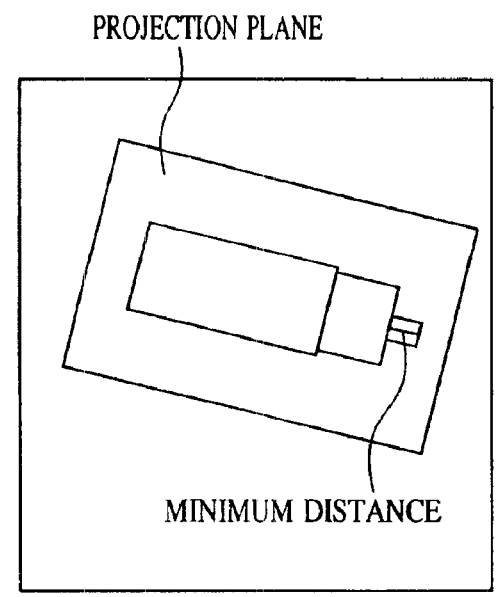

The processing step of changing, in step S2080, the viewing direction to the direction perpendicular to the projection plane differs from a known method. FIG. 23A shows an example of the displayed measurement result in the known method. FIG. 23B shows an example of the displayed measurement result in the fourth embodiment in which the viewing direction is changed to the direction perpendicular to the projection plane. As shown in FIGS. 23A and 23B, even when a three-dimensional graphics processing apparatus for displaying a stereographic image is employed, it is preferred that the measurement result be displayed in the two-dimensional plane, as shown in FIG. 23B. Thus, it becomes easier for the user to see and confirm the measurement result.

By changing, in step S2080, the viewing direction to the direction perpendicular to the projection plane, visibility is improved, and the graphics processing apparatus with high usability is provided.

Although the process in which the user selects the projection plane from among preset planes is described in the fourth embodiment, the method according to the first to third embodiments in which the projection plane is automatically determined can be adopted.

Fifth Embodiment

Figure 24:
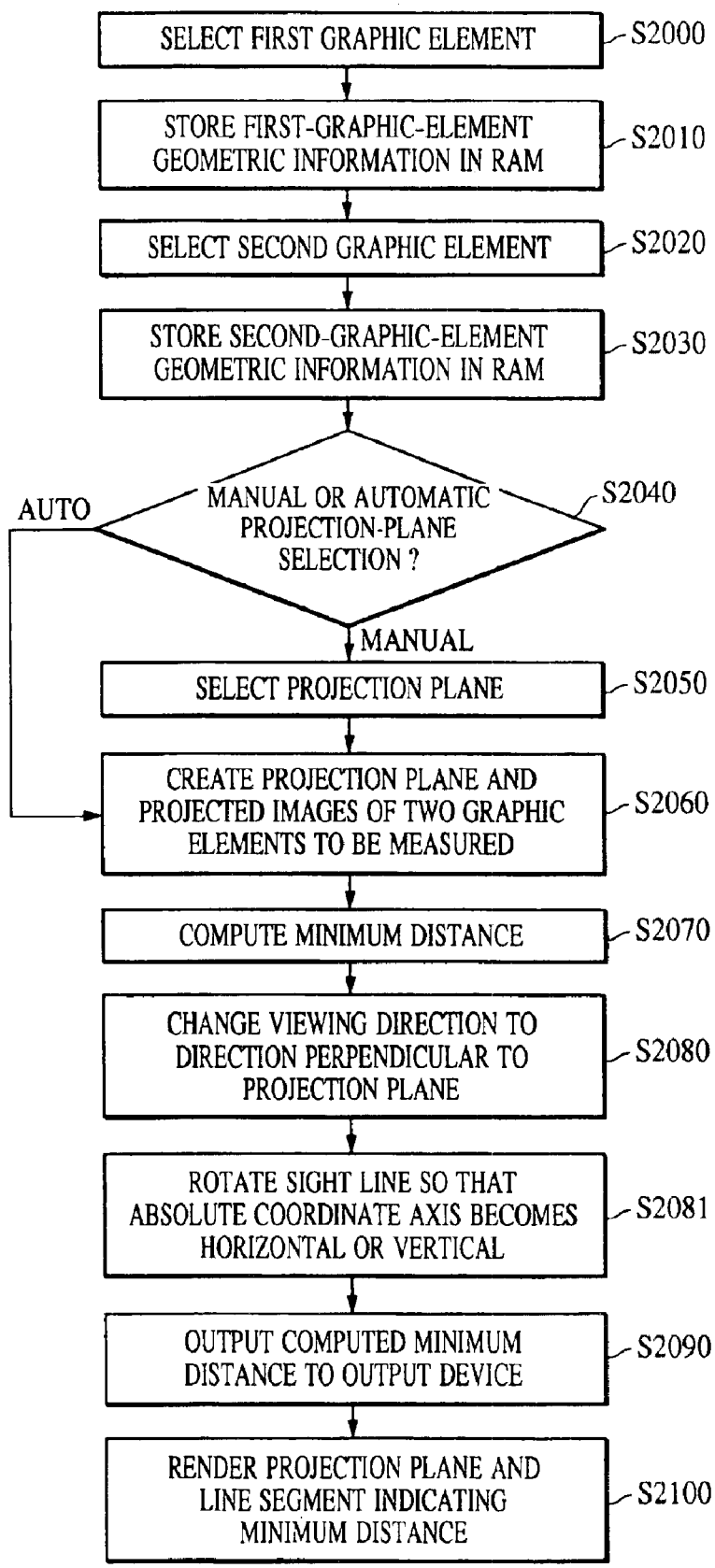
FIG. 24 is a flowchart showing a process according to a fifth embodiment of the present invention, which is performed by the graphics processing apparatus shown in FIG. 20.

Referring to a flowchart shown in FIG. 24, a fifth embodiment of the present invention will now be described. Although a process similar to that in the fourth embodiment is performed in the fifth embodiment, the process in the fifth embodiment differs from that in the fourth embodiment in the following respects:

Subsequent to step S2080, step S2081 is added to the process. In step S2081, the sight line is rotated so that a projected line (which is generated by projecting onto the projection plane one of three absolute coordinate axes, that is, the x-axis, the y-axis, and the z-axis, which forms the smallest angle with the projection plane) becomes horizontal or vertical in a graphic display area of a display. The rotation angle employed to make the projected line become horizontal or vertical is the angle which has the smallest absolute value of all combinations, such as in the horizontal direction, the vertical direction, the clockwise direction, and the counterclockwise direction.

Figure 25A:
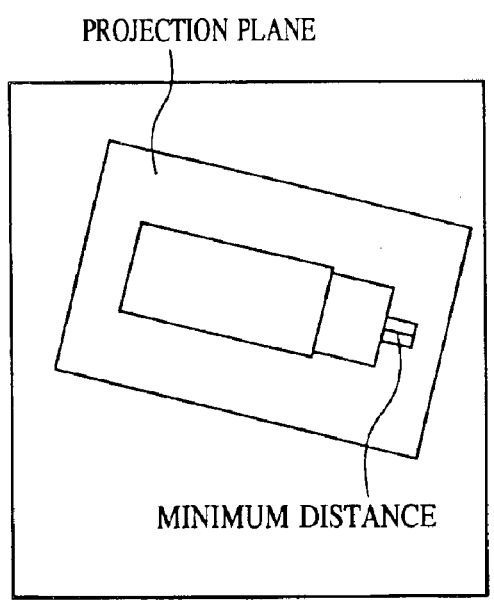
FIGS. 25A and 25B illustrate examples of images displayed on the display shown in FIG. 20.
Figure 25B:
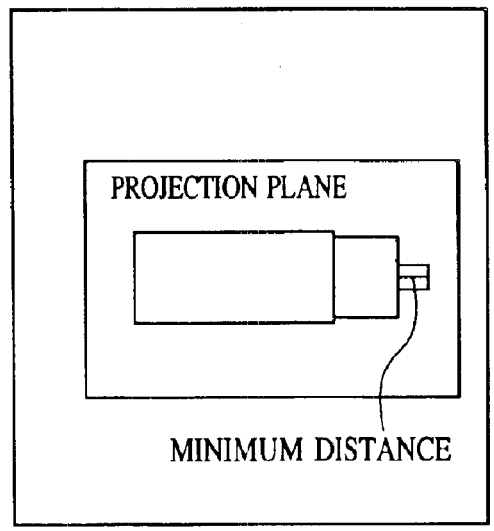

FIG. 25A shows the displayed measurement result in the fourth embodiment. FIG. 25B shows the displayed measurement result when the sight line is rotated so that one of the absolute coordinate planes, namely, the xy plane, the yz plane, and the xz plane, coincides with either the horizontal or the vertical direction in the fifth embodiment. When the current viewing direction is simply changed to the direction from which the projection plane is viewed, it is very likely that the measurement result is displayed at an angle. In most cases, graphic elements rendered in the graphics processing apparatus are parallel or perpendicular to one of three absolute coordinate axes, that is, the x-axis, the y-axis, and the z-axis. Thus, when the sight line is rotated, such as in step S2081, it becomes more likely that graphic elements and a line segment indicating the minimum distance would be displayed in the horizontal or vertical direction in the graphic display area of the display.

By rotating and displaying the sight line so that the projected line (which is generated by projecting onto the projection plane one of three absolute coordinate axes, that is, the x-axis, the y-axis, and the z-axis, which forms the smallest angle with the projection plane) becomes horizontal or vertical in the graphic display area of the display, it becomes easier for the user to confirm the measurement result, and visibility is improved. With these advantages, the graphics processing apparatus with high visibility and improved usability can be provided.

Sixth Embodiment

Figure 26:
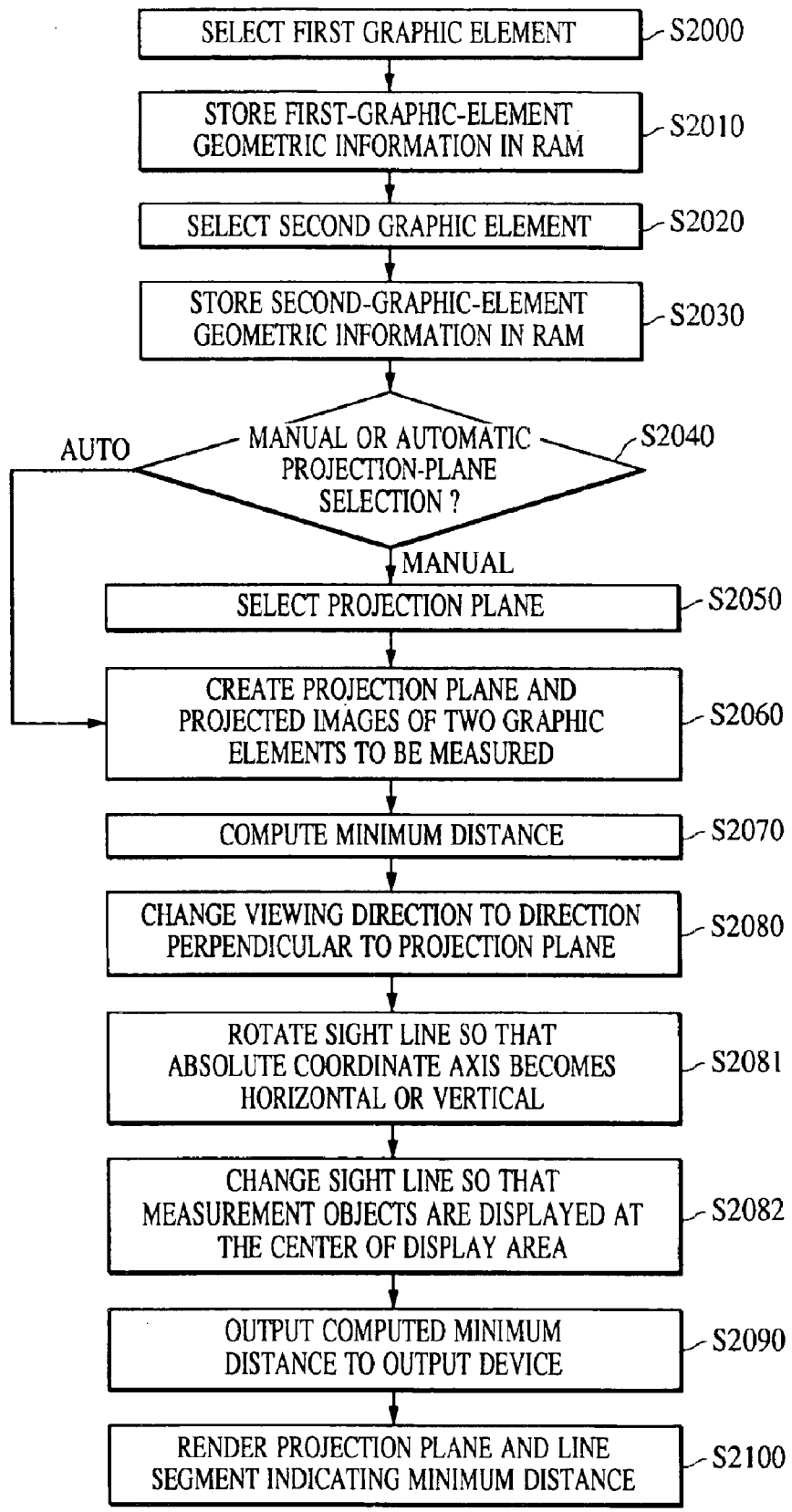
FIG. 26 is a flowchart showing a process according to a sixth embodiment of the present invention, which is performed by the graphics processing apparatus shown in FIG. 20.

Referring to a flowchart shown in FIG. 26, a sixth embodiment of the present invention will now be described. Although a process similar to that in the fifth embodiment is performed in the sixth embodiment, the process in the sixth embodiment differs from that in the fifth embodiment in the following respects:

Subsequent to step S2081, step S2082 is added to the process. In step S2082, the sight line position and zooming are set in order that the two graphic elements, which are projected onto the projection plane, and the line segment, which indicates the minimum distance, can be displayed at the center of the graphic display area 281 of the display 208a.

The processing step of setting the sight line position and zooming so that the two graphic elements, which are projected onto the projection plane, and the line segment, which indicates the minimum distance, may be displayed at the center of the graphic display area 281 of the display 208a differs from the processes in the first and the fifth embodiments. FIG. 27A shows the displayed measurement result in the fifth embodiment. FIG. 27B shows the displayed measurement result in the sixth embodiment in which the sight line position and zooming are set. As a parameter for setting the sight line position and zooming, the ratio of "an area displaying the two graphic elements, which are projected onto the projection plane, and the line segment, which indicates the minimum distance" to "the graphic display area 281 of the display 208a" can be used. The ratio can be fixed as a constant. Also, the ratio can be appropriately changed in accordance with the size of an object to be measured. Alternately, the ratio can be set by the user. FIG. 27B shows a case in which the ratio is 20%.

By displaying the measured portion substantially at the center of the graphic display area 281 of the display 208a, it becomes easier for the user to confirm the measurement result, and visibility is improved. With these advantages, the graphics processing apparatus with higher visibility and improved usability can be provided.

Seventh Embodiment

Figure 28:
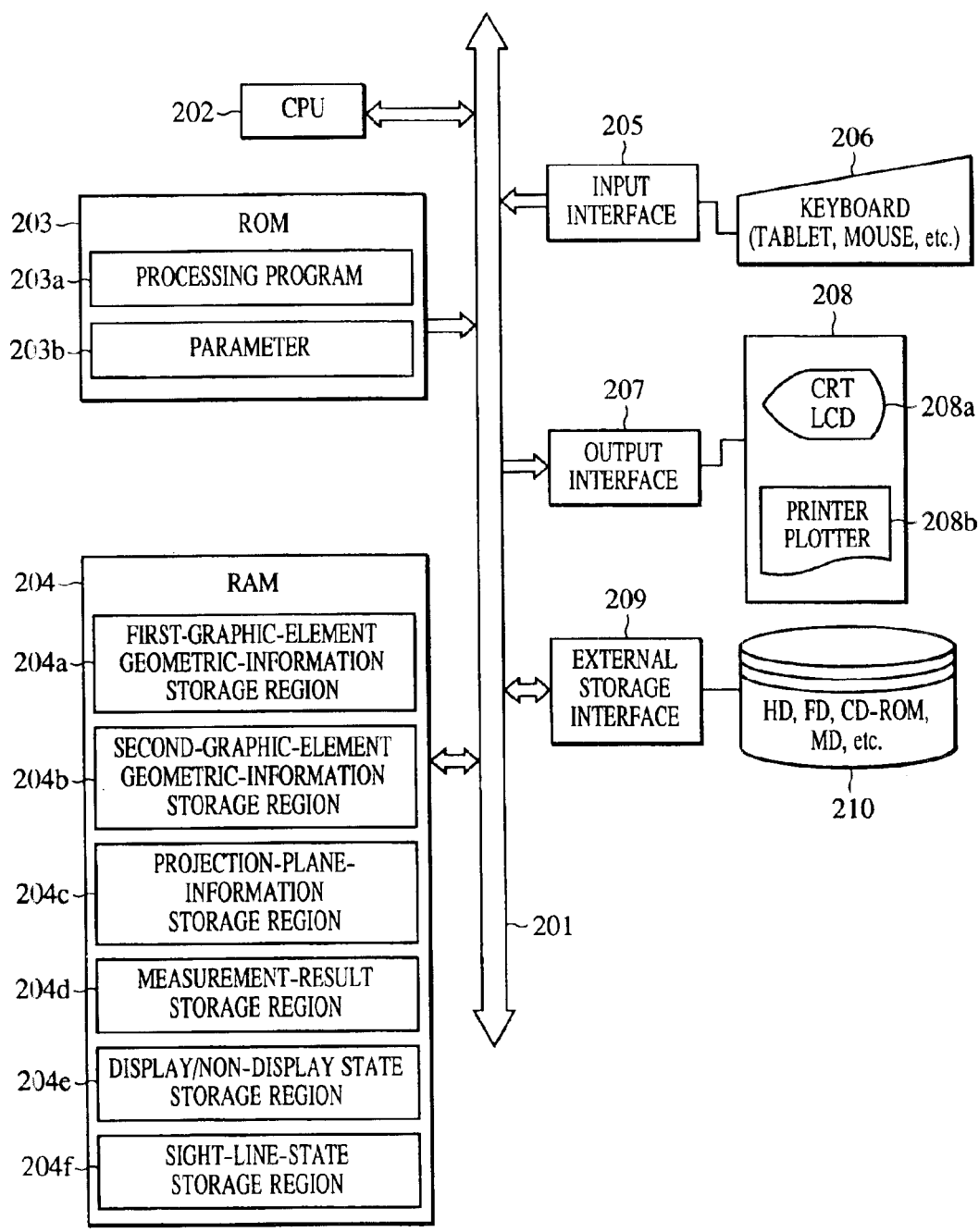
FIG. 28 is a block diagram of a graphics processing apparatus according to a seventh embodiment of the present invention.
Figure 29:
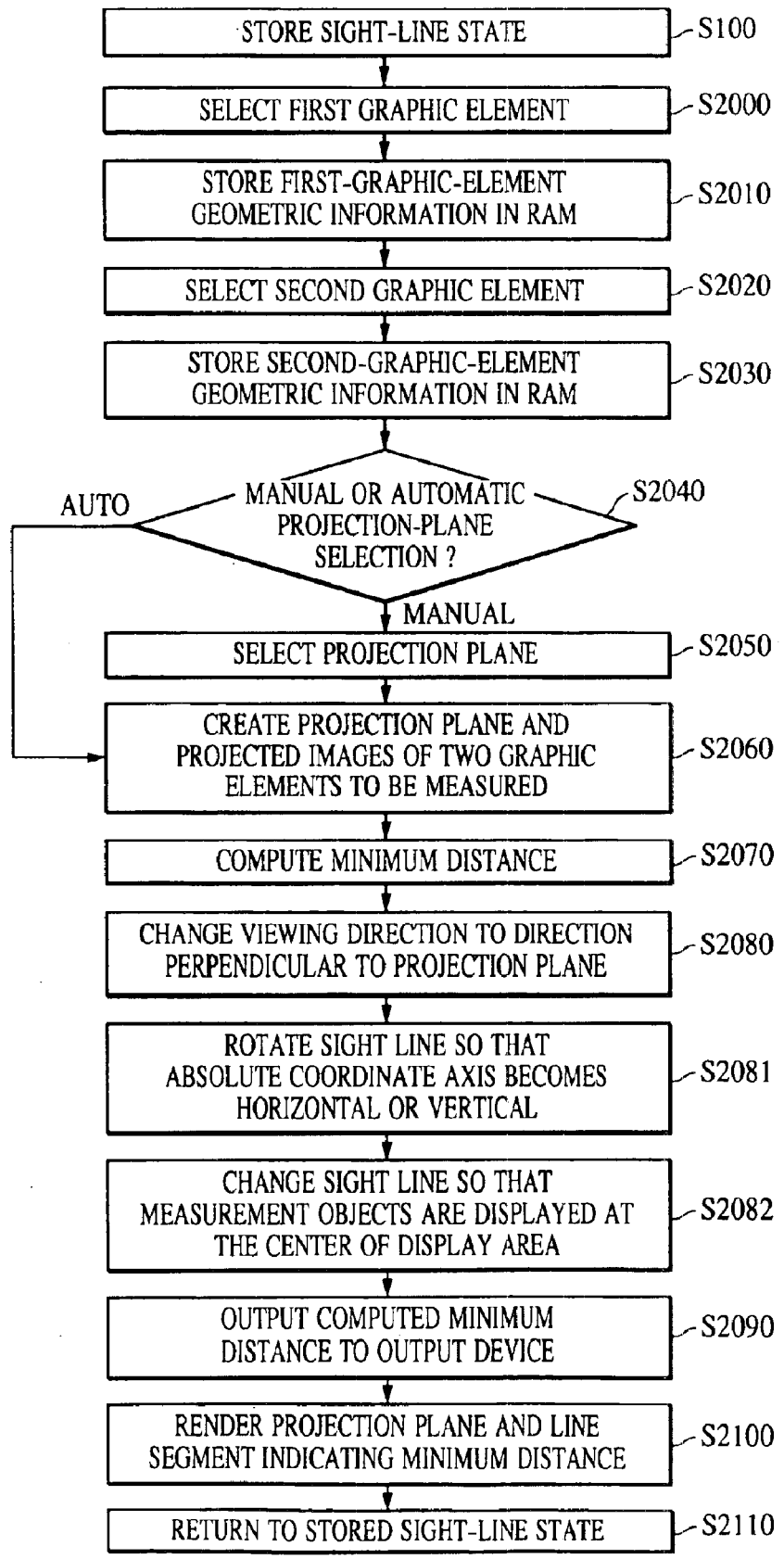
FIG. 29 is a flowchart showing a process according to the seventh embodiment, which is performed by the graphics processing apparatus shown in FIG. 28.
Figure 30A:
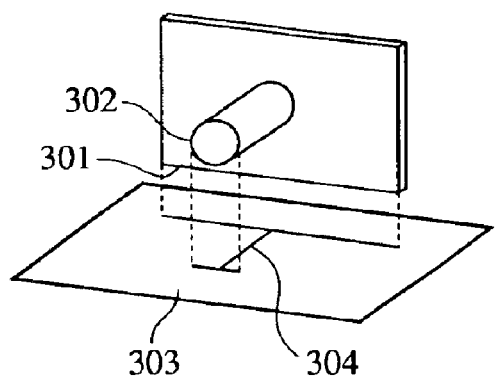
FIGS. 30A and 30B illustrate examples of the measurement results computed and displayed by a known apparatus.
Figure 30B:
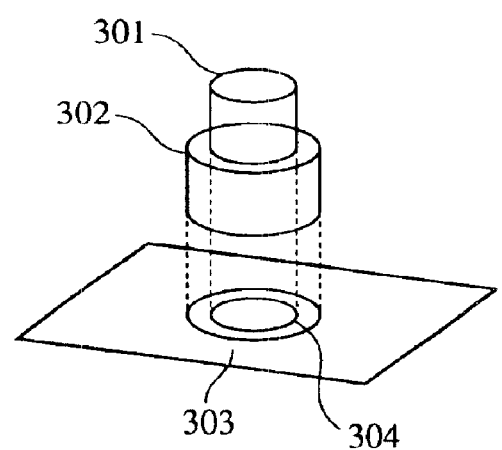
Figure 31:
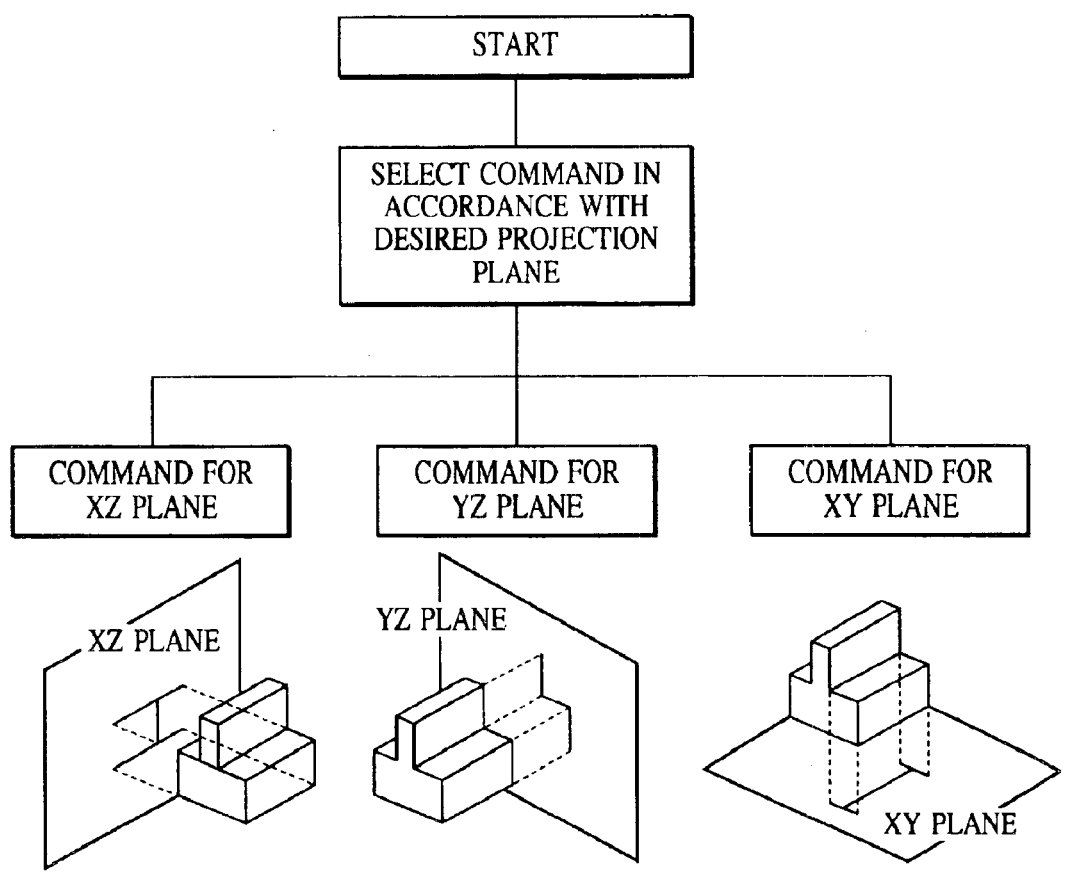
FIG. 31 illustrates an example of a known graphics processing apparatus.
Figure 32:
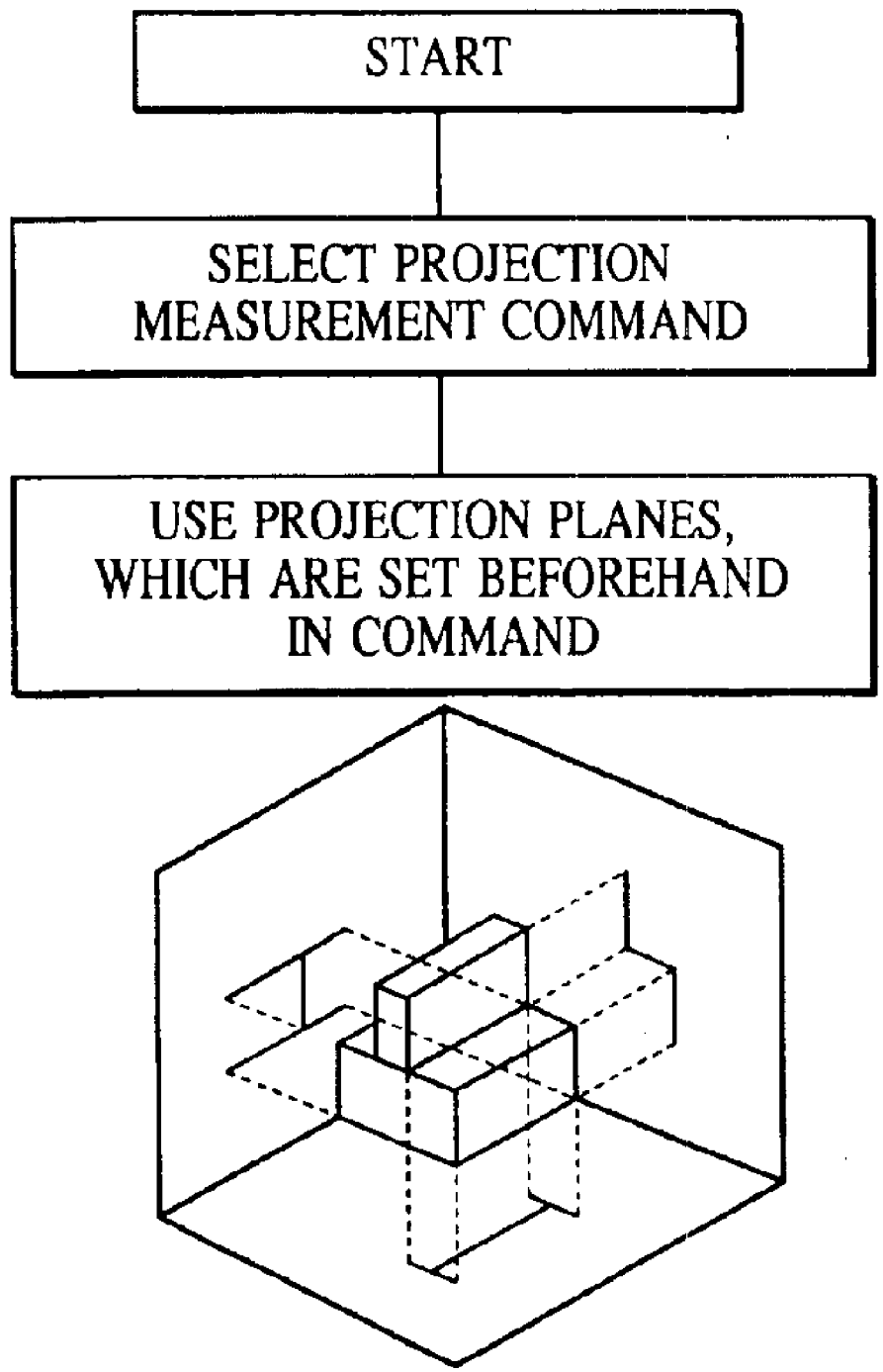
FIG. 32 illustrates another example of a known graphics processing apparatus.
Figure 33:
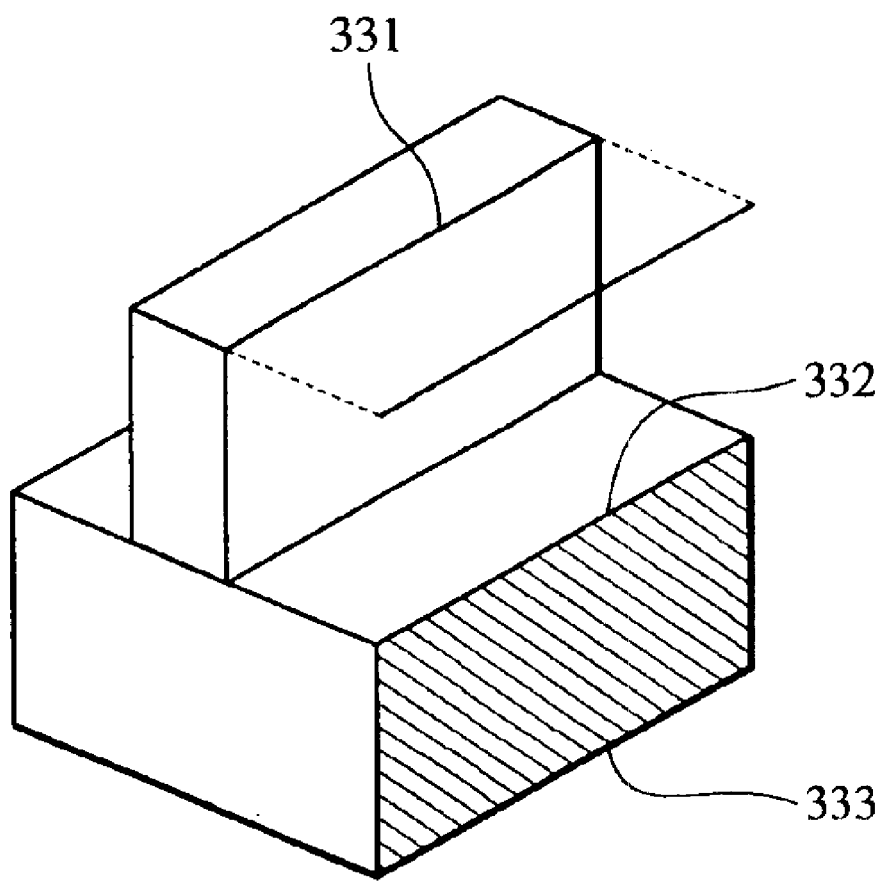
FIG. 33 illustrates yet another example of a known graphics processing apparatus.

Referring to FIGS. 28 and 29, a seventh embodiment of the present invention will now be described.

FIG. 28 is a block diagram of a graphics processing apparatus according to the seventh embodiment of the present invention. The graphics processing apparatus of the seventh embodiment differs from that shown in FIG. 20 in that a component display/non-display state storage region 204e and a sight-line-state storage region 204f are added to the RAM 204 in FIG. 28.

FIG. 29 is a flowchart showing a process after the graphics processing apparatus has entered a minimum-distance computation mode according the seventh embodiment. Although the process in the seventh embodiment is similar to that in the sixth embodiment, the process in the seventh embodiment differs from that in the sixth embodiment in the following respects:

In step S100, the "sight line position and zooming state" at the time the apparatus enters the minimum-distance computation mode are stored as a "sight-line state list" in the sight-line-state storage region 204f of the RAM 204. At the same time, the "display/non-display states of all components displayed on the display" are stored as a "display state list" in the component display/non-display state storage region 204e of the RAM 204. The processing from step S100 onward to S2100 is the same as that in the sixth embodiment.

When terminating the minimum-distance computation mode, step S2110 is added. In step S2110, the process reads the "sight-line state list", which is stored in the sight-line-state storage region 204f of the RAM 204, and the "display state list", which is stored in the component display/non-display state storage region 204e of the RAM 204. In accordance with the read lists, the process causes the sight-line position, the sight-line direction, the zooming state, and the display/non-display states of all the components displayed on the display 208a to return to the previous states before the apparatus has entered the minimum-distance computation mode. Subsequently, the minimum-distance computation mode is terminated.

In the fourth embodiment, the viewing direction is changed to the direction perpendicular to the projection plane. In the fifth embodiment, a projected line is caused to be horizontal or vertical in the graphic display area of the display. In the sixth embodiment, the measured portion is displayed substantially at the center of the display. Accordingly, it becomes easier for the user to confirm the measurement result, and visibility is improved. When the minimum-distance computation mode is terminated without altering the display state, it is likely that the display state would be inappropriate for the user to continue working on the processing after the minimum-distance computation. In the seventh embodiment, the sight line and the display/non-display states of components at the time the apparatus has entered the minimum-distance computation mode are stored. When the minimum-distance computation mode is terminated, the sight line and the component states are caused to return to the stored previous states. Accordingly, the user can automatically obtain a display state in which the user can easily continue working on the processing after the minimum-distance computation. Thus, a graphics processor apparatus whose usability is further improved can be provided.

As described above, according to the first embodiment, the projecting direction is specified by referring to the graphic-element geometric information and the viewing direction. Thus, without making the user select a projection plane, the minimum distance between graphic elements, which are projected in the user's desired direction, can be displayed, so that the matching probability is greatly increased.

By specifying the position of the projection plane by referring to the graphic-element geometric information and the viewing direction, it is possible to provide the graphics processing apparatus and method capable of displaying the measurement results, which are highly visible to the user.

According to the second embodiment, by changing the time at which the viewing direction is stored, the graphics processing apparatus can satisfy various demands of the user.

According to the third embodiment, it is possible to provide the graphics processing apparatus and method capable of displaying the measurement results, which are more highly visible to the user.

According to the fourth embodiment, by changing the viewing direction to the direction perpendicular to the projection plane, it becomes easier for the user to confirm the measurement results.

According to the fifth embodiment, by rotating the sight line so that a projected line (which is obtained by projecting onto the projection plane one of three absolute coordinate axes, that is, the x-axis, the y-axis, and the z-axis, which forms the smallest angle with the projection plane) becomes horizontal or vertical in the graphic display area of the display, it becomes easier for the user to confirm the measurement results.

According to the sixth embodiment, the sight line is moved so that the measured portion can be displayed at the center of the graphic display area. Thus, it becomes easier for the user to confirm the measurement results.

According to the seventh embodiment, the sight line and the display/non-display states of components are stored, and, when the minimum-distance computation mode is terminated, the display state is caused to return to the previous state. Accordingly, the user can automatically obtain a display state in which the user can easily continue working on the processing subsequent to the minimum-distance computation.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A graphics processing apparatus comprising:

display means for displaying a stereographic image of three dimensional graphic elements;

input means for inputting an operation regarding the stereographic image displayed on said display means;

geometric information storage means for storing, when a first graphic element and a second graphic element are selected by said input means, geometric information relating to the selected first and second graphic elements;

first reference determination means for determining a projection reference for the first graphic element in accordance with the first-graphic-element geometric information;

second reference determination means for determining a projection reference for the second graphic element in accordance with the second-graphic-element geometric information;

viewing-direction storage means for storing a viewing direction from which the image displayed on said display means is viewed;

projection-plane determination means for determining a projection plane onto which the first and second graphic elements are projected in accordance with the viewing direction, the first-graphic-element projection reference, and the second-graphic-element projection reference;

projection means for projecting the first graphic element and the second graphic element onto the projection plane; and arithmetic computing means for computing a distance between the first graphic element and the second graphic element in accordance with the graphic elements projected onto the projection plane.

2. A graphics processing apparatus according to claim 1, wherein the viewing direction comprises a viewing direction of the first graphic element or the second graphic element when the first graphic element or the second graphic element, respectively, is selected.

3. A graphics processing apparatus according to claim 1, further comprising first selection display means for displaying, when there is a plurality of projection planes, information for selecting at least one projection plane of the plurality of projection planes on said display means.

4. A graphics processing apparatus according to claim 3, further comprising second selection display means for displaying, when there is a plurality of projection planes, information for selecting one projection plane of the plurality of projection planes on said display means.

5. A graphics processing apparatus according to claim 1, wherein, when there is a plurality of projection planes, a higher priority is given to the projection plane whose normal direction produces a smaller angle with the viewing direction.

6. A graphics processing apparatus according to claim 1, wherein, when there is a plurality of projection planes, the projection planes are prioritized in accordance with a predetermined table.

7. A graphics processing apparatus according to claim 6, wherein, when there is a plurality of projection planes, and when equal priority is given to the projection planes in accordance with the predetermined table, a higher priority is given to the projection plane whose normal direction produces a smaller angle with the viewing direction.

8. A graphics processing apparatus according to claim 1, wherein the distance is a minimum distance.

9. A graphics processing apparatus according to claim 1, wherein the projection plane is determined in accordance with a combination of the shape of the first graphic element and the shape of the second graphic element.

10. A graphics processing apparatus comprising:
    display means for displaying a stereographic image of three dimensional graphic elements;
    input means for inputting an operation regarding the stereographic image displayed on said display means;
    geometric information storage means for storing, when a first graphic element and a second graphic element are selected by said input means, geometric information relating to the selected first and second graphic elements;
    setting means for setting a projection plane onto which the first graphic element and the second graphic element are projected;
    projection means for projecting the first graphic element and the second graphic element onto the projection plane;
    computation means for computing a direction perpendicular to the projection plane;
    display control means for displaying the projection plane on said display means in accordance with the computed direction; and
    arithmetic processing means for computing a distance between the first graphic element and the second graphic element from the projection of the first and second graphic elements onto the projection plane,
    wherein the computed distance is displayed on the pojection plane displayed on said display means.

11. A graphics processing apparatus according to claim 10, further comprising comparison means for comparing the computed direction with a viewing direction when the projection plane is displayed,
    wherein the projection plane is moved in accordance with the result of the comparison by said comparison means.

12. A graphics processing apparatus according to claim 10, further comprising zoom means for zooming with respect to the displayed projection plane.

13. A graphics processing apparatus according to claim 10, further comprising previous-state storage means for storing a display state prior to displaying the projection plane on said display means; and
    control means for returning the display state to the state stored in said previous-state storage means.

14. A graphics processing method for a graphics processing apparatus including display means for displaying a stereographic image of three dimensional graphic elements and input means for inputting an operation regarding the stereographic image displayed on the display means, said graphics processing method comprising:
    a geometric information storing step of storing, when a first graphic element and a second graphic element are selected by the input means, geometric information relating to the selected first and second graphic elements;
    a first reference determination step of determining a projection reference for the first graphic element in accordance with the first-graphic-element geometric information;
    a second reference determination step of determining a projection reference for the second graphic element in accordance with the second-graphic-element geometric information;
    a viewing-direction storing step of storing a viewing direction from which the image displayed on the display means is viewed;
    a projection-plane determination step of determining a projection plane onto which the first and second graphic elements are projected in accordance with the viewing direction, the first-graphic-element projection reference, and the second-graphic-element projection reference;
    a projection step of projecting the first graphic element and the second graphic element onto the projection plane; and
    an arithmetic computing step of computing a distance between the first graphic element and the second graphic element in accordance with the projection of the first and second graphic elements onto the projection plane.

15. A graphics processing method for a graphics processing apparatus including display means for displaying a stereographic image of three dimensional graphic elements and input means for inputting an operation regarding the stereographic image displayed on the display means, said graphics processing method comprising:
    a geometric information storing step of storing, when a first graphic element and a second graphic element are selected by the input means, geometric information relating to the selected first and second graphic elements;
    a setting step of setting a projection plane onto which the first graphic element and the second graphic element are projected;

a projection step of projecting the first graphic element and the second graphic element onto the projection plane;

a computation step of computing a direction perpendicular to the projection plane;

a display control step of displaying the projection plane on the display means in accordance with the computed direction; and an arithmetic processing step of computing a distance between the first graphic element and the second graphic element from the projection of the first and second graphic elements onto the projection plane, wherein the computed distance is displayed on the projection plane.

16. A graphics processing apparatus comprising:

a processing device for projecting a first three-dimensional graphic element and a second three-dimensional graphic element onto a projection plane, and deriving a distance between the first and second three-dimensional graphic elements from first and second graphic elements obtained by projecting the first and second three-dimensional graphic elements onto the projection plane; and a display control device for controlling a display of the derived distance.

17. A graphics processing method comprising:

a projecting step, of projecting a first three-dimensional graphic element and a second three-dimensional graphic element onto a projection plane;

a deriving step, of deriving a distance between the first and second three-dimensional graphic elements from first and second graphic elements obtained by projecting the first and second three-dimensional graphic elements onto the projection plane; and a display control step, of controlling a display of the derived distance.

* * * * *

UNITED STATES PATENT AND TRADEMARK OFFICE
CERTIFICATE OF CORRECTION

PATENT NO. : 6,897,860 B2
DATED : May 24, 2005
INVENTOR(S) : Hitoshi Nishitani et al.

It is certified that error appears in the above-identified patent and that said Letters Patent is hereby corrected as shown below:

Column 11,
Line 36, "graphic/elements" should read -- graphic elements --.

Column 25,
Line 66, "pojec-" should read -- projec- --.

Signed and Sealed this

First Day of November, 2005

JON W. DUDAS
*Director of the United States Patent and Trademark Office*